(12) United States Patent
Chang

(10) Patent No.: US 8,605,364 B2
(45) Date of Patent: Dec. 10, 2013

(54) MINIATURE ZOOM LENS

(75) Inventor: Yu-Min Chang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 72 days.

(21) Appl. No.: 13/316,143

(22) Filed: Dec. 9, 2011

(65) Prior Publication Data

US 2012/0162780 A1  Jun. 28, 2012

(30) Foreign Application Priority Data

Dec. 28, 2010 (TW) ................................ 99146445 A

(51) Int. Cl.
*G02B 15/14* (2006.01)
(52) U.S. Cl.
USPC .......................................... 359/687; 359/676
(58) Field of Classification Search
USPC .................. 359/680–682, 676, 687
See application file for complete search history.

(56) References Cited

U.S. PATENT DOCUMENTS 4,687,303 A * 8/1987 Takahashi et al. ............ 359/685

* cited by examiner

*Primary Examiner* — James Greece
(74) *Attorney, Agent, or Firm* — Tracy M. Heims; Apex Juris, pllc

(57) ABSTRACT

A zoom lens of the present invention includes a first lens group, a second lens group, an aperture, a third lens group, a fourth lens group, and an image surface in sequence along an optical axis from an object side to an image side. The first lens group has positive refractive power, and includes at least two lenses. The second lens group has negative refractive power, and includes three lenses. The third lens group has positive refractive power, and includes at least two lenses. The fourth lens group has positive refractive power. The zoom lens is switched to a telephoto mode from a wide-angle mode by moving the first lens group toward the object side, moving the second lens group toward the image side, and moving the third lens group toward the object side.

14 Claims, 48 Drawing Sheets

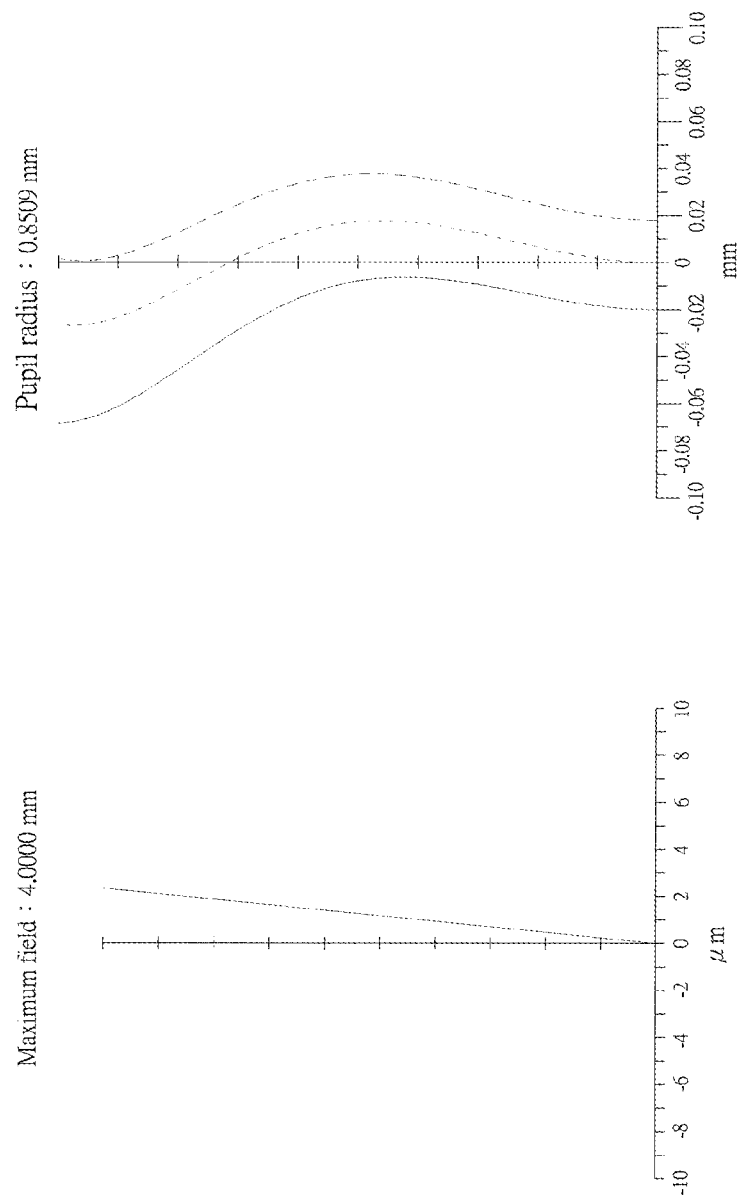

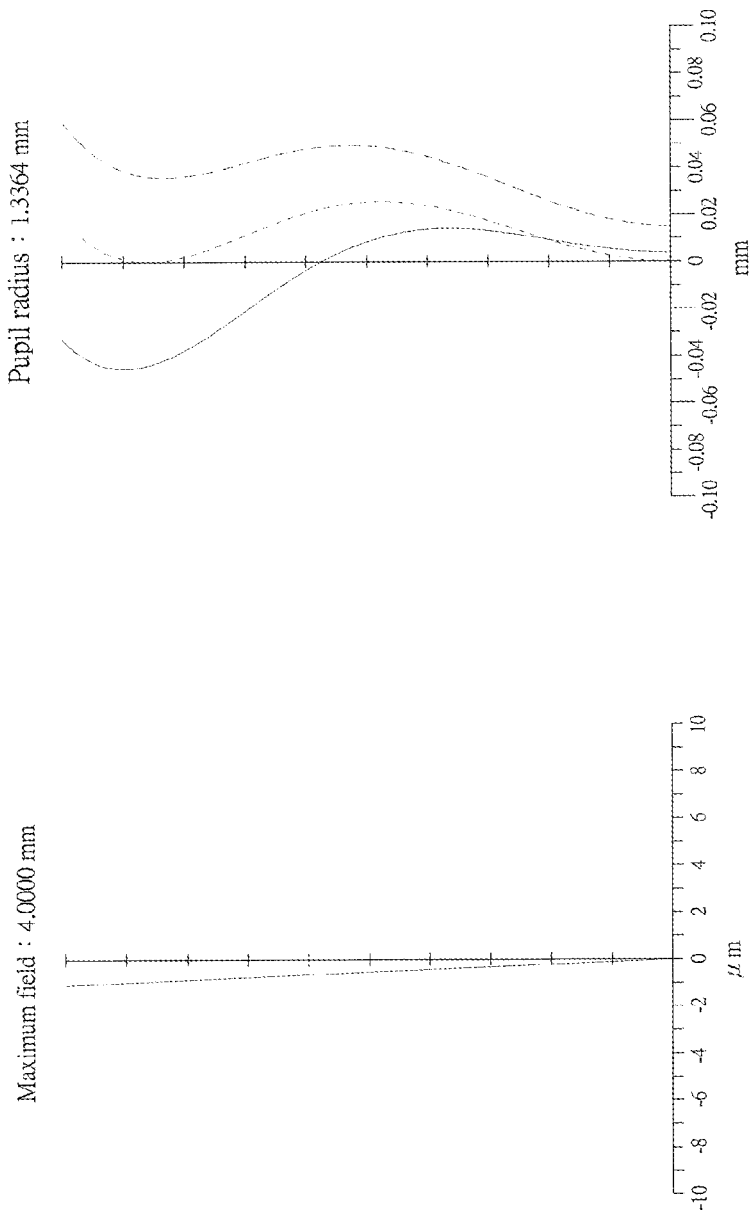

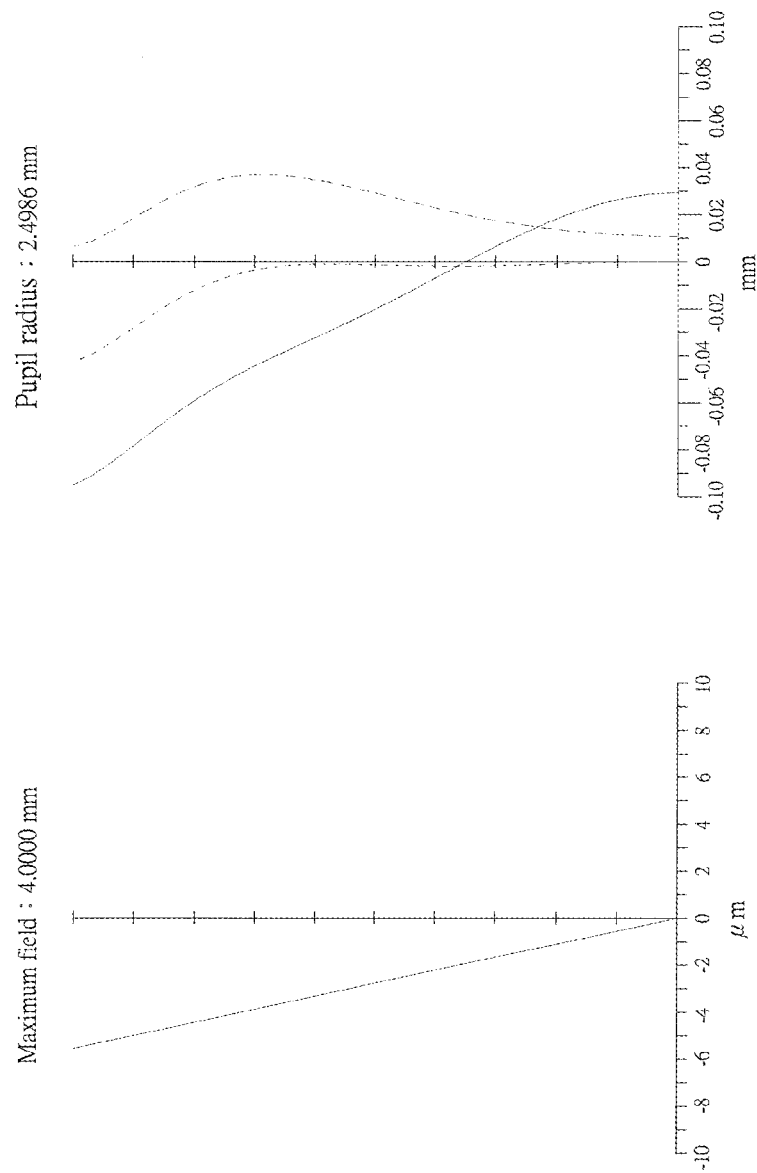

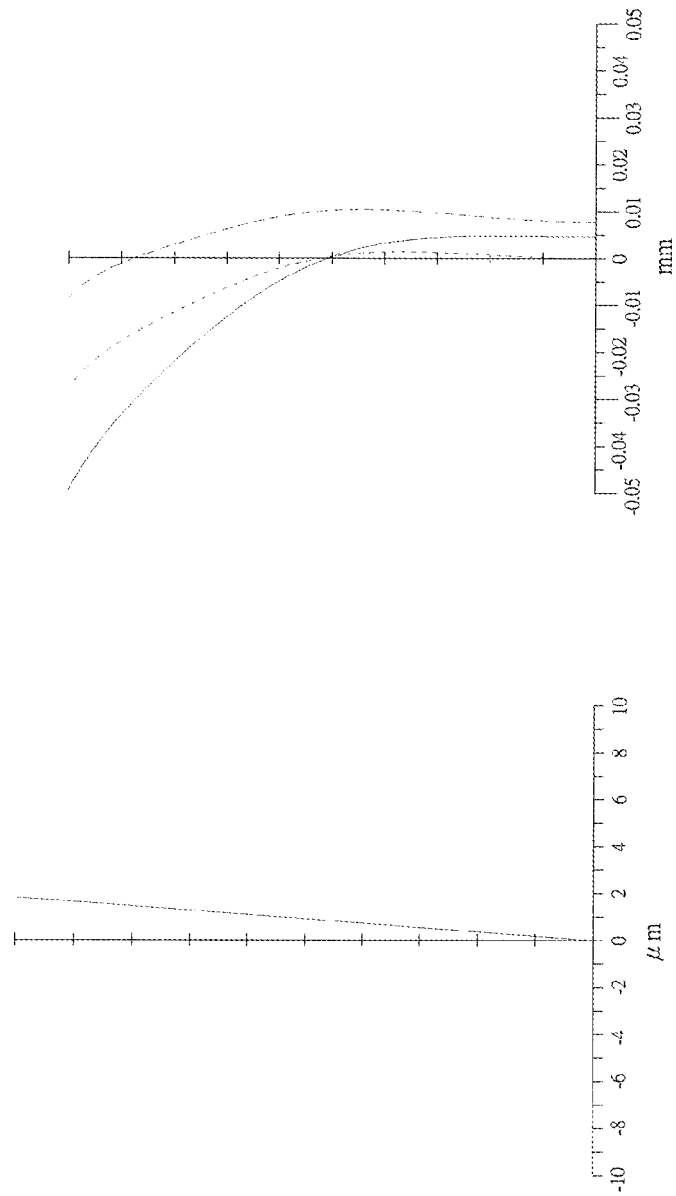

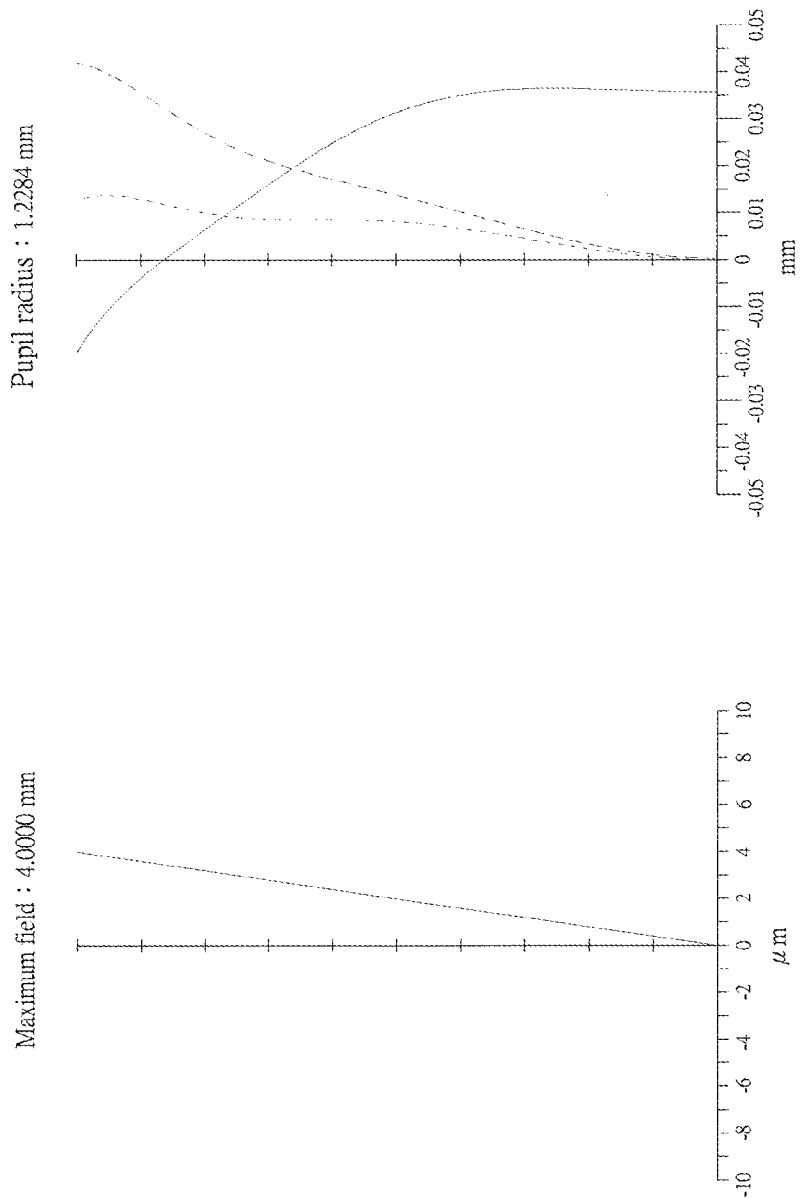

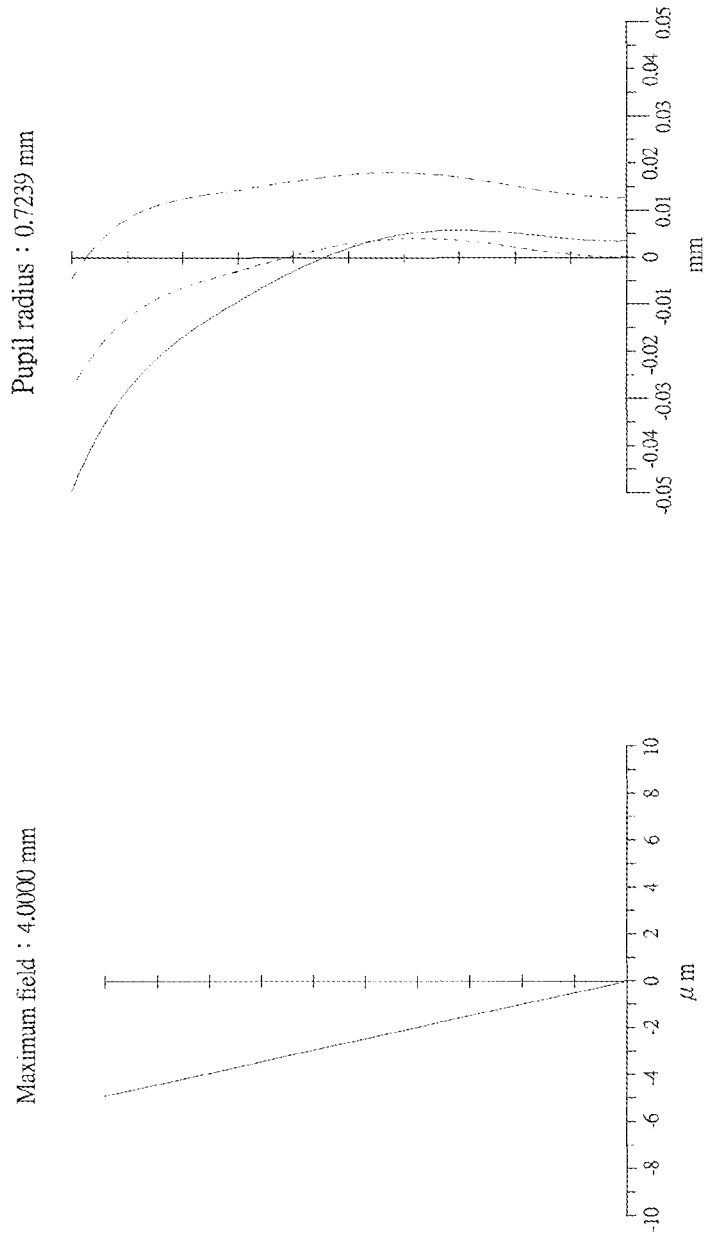

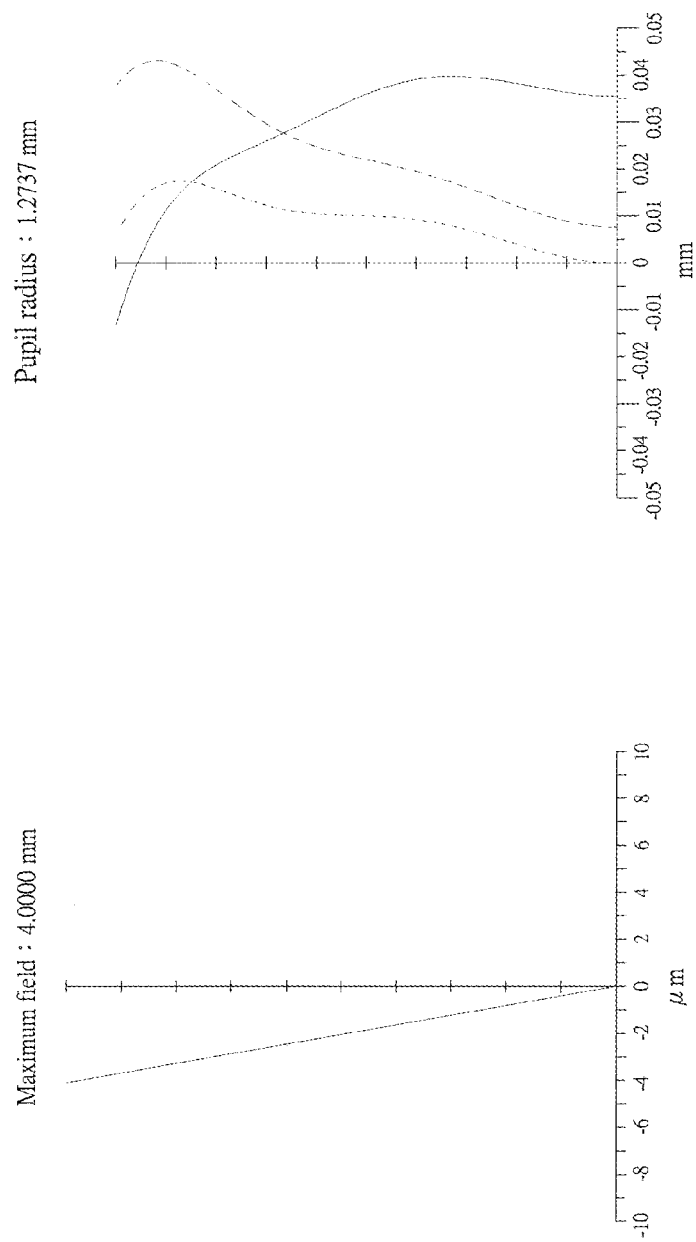

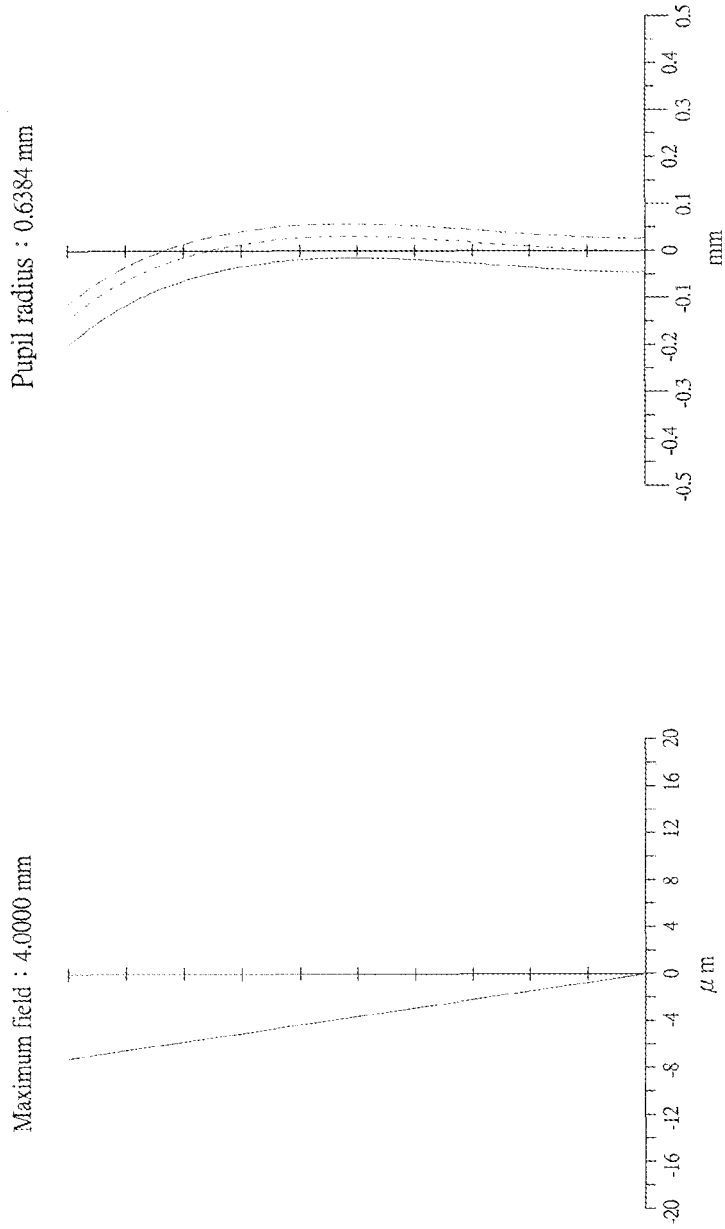

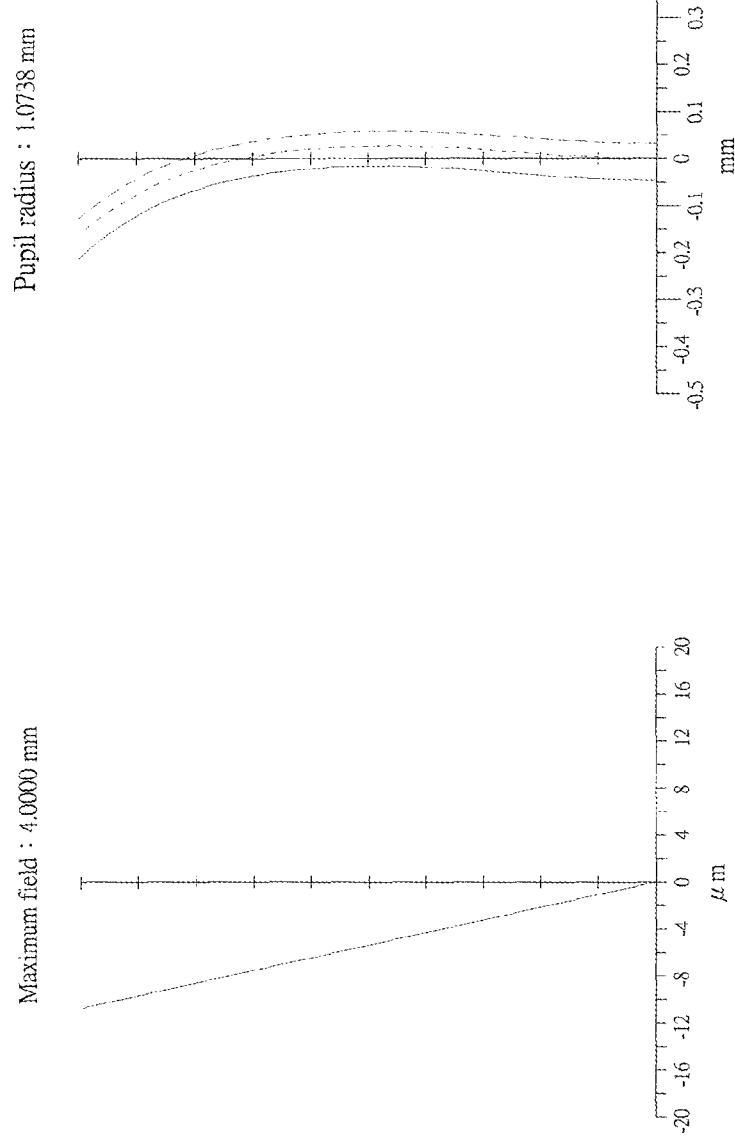

MINIATURE ZOOM LENS

BACKGROUND OF THE INVENTION

1. Field of the Invention

The present invention relates generally to a lens, and more particularly to a miniature zoom lens.

2. Description of the Related Art

With advancement in technology, image devices, such as camera, video camera, microscope, and scanner, are made smaller and lighter for portability and operation that the zoom lenses incorporated in such image devices have to reduce its size. Except that, the zoom lenses must have high optical performance, such as high zoom ratio, high resolution, and high contrast. Therefore, small size and high optical performance are the important facts of the modern zoom lenses.

In order to raise the zoom ratio and the optical performance, more and more lens groups are provided in the zoom lens. As we know, some zoom lenses have twenty lens groups or more. It is obvious that more lens groups will cause the zoom lens bigger and heavier. However, when the zoom lens has fewer lens groups, it may have a small size, but the optical performance is poor.

SUMMARY OF THE INVENTION

The primary objective of the present invention is to provide a miniature zoom lens, which has a small size, high zoom ratio, and high optical performance.

According to the objective of the present invention, a zoom lens includes a first lens group, a second lens group, an aperture, a third lens group, a fourth lens group, and an image surface in sequence along an optical axis from an object side to an image side. The first lens group has positive refractive power, and includes at least two lenses, wherein one of the lenses has negative refractive power, and one of the lenses has positive refractive power. The second lens group has negative refractive power, and includes three lenses, wherein one of the lenses has positive refractive power, and the rest two lenses have negative refractive power. The third lens group has positive refractive power, and includes at least two lenses, wherein one of the lenses has negative refractive power, and one of the lenses has positive refractive power. The fourth lens group has positive refractive power. The zoom lens is switched to a telephoto mode from a wide-angle mode by moving the first lens group toward the object side, moving the second lens group toward the image side, and moving the third lens group toward the object side.

The zoom lens of the present invention is miniaturized and keeps a high optical performance.

BRIEF DESCRIPTION OF THE DRAWINGS

FIG. 10B is a transverse chromatic aberration diagram of the second preferred embodiment of the present invention in the wide-angle mode;

FIG. 10C is a spherical aberration diagram of the second preferred embodiment of the present invention in the wide-angle mode;

FIG. 11B is a transverse chromatic aberration diagram of the second preferred embodiment of the present invention in the middle mode;

FIG. 11C is a spherical aberration diagram of the second preferred embodiment of the present invention in the middle mode;

FIG. 16B is a transverse chromatic aberration diagram of the third preferred embodiment of the present invention in the wide-angle mode;

FIG. 16C is a spherical aberration diagram of the third preferred embodiment of the present invention in the wide-angle mode;

FIG. 17B is a transverse chromatic aberration diagram of the third preferred embodiment of the present invention in the middle mode;

FIG. 17C is a spherical aberration diagram of the third preferred embodiment of the present invention in the middle mode;

FIG. 22B is a transverse chromatic aberration diagram of the fourth preferred embodiment of the present invention in the wide-angle mode;

FIG. 22C is a spherical aberration diagram of the fourth preferred embodiment of the present invention in the wide-angle mode;

DETAILED DESCRIPTION OF THE INVENTION

First Preferred Embodiment

Figure 1:
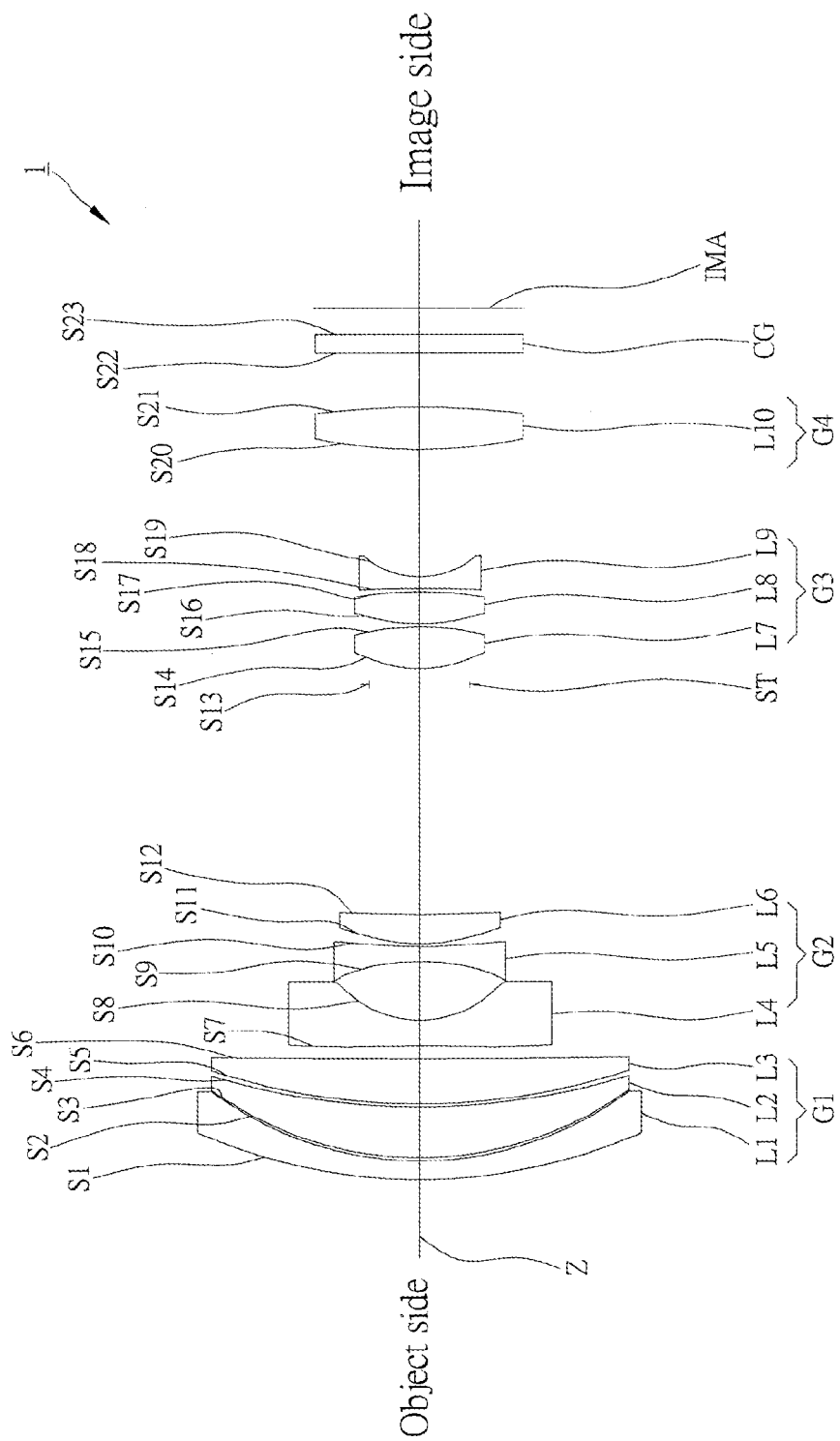
FIG. 1 is a sketch diagram of the arrangement of the lenses of a first preferred embodiment of the present invention in the wide-angle mode.
Figure 2:
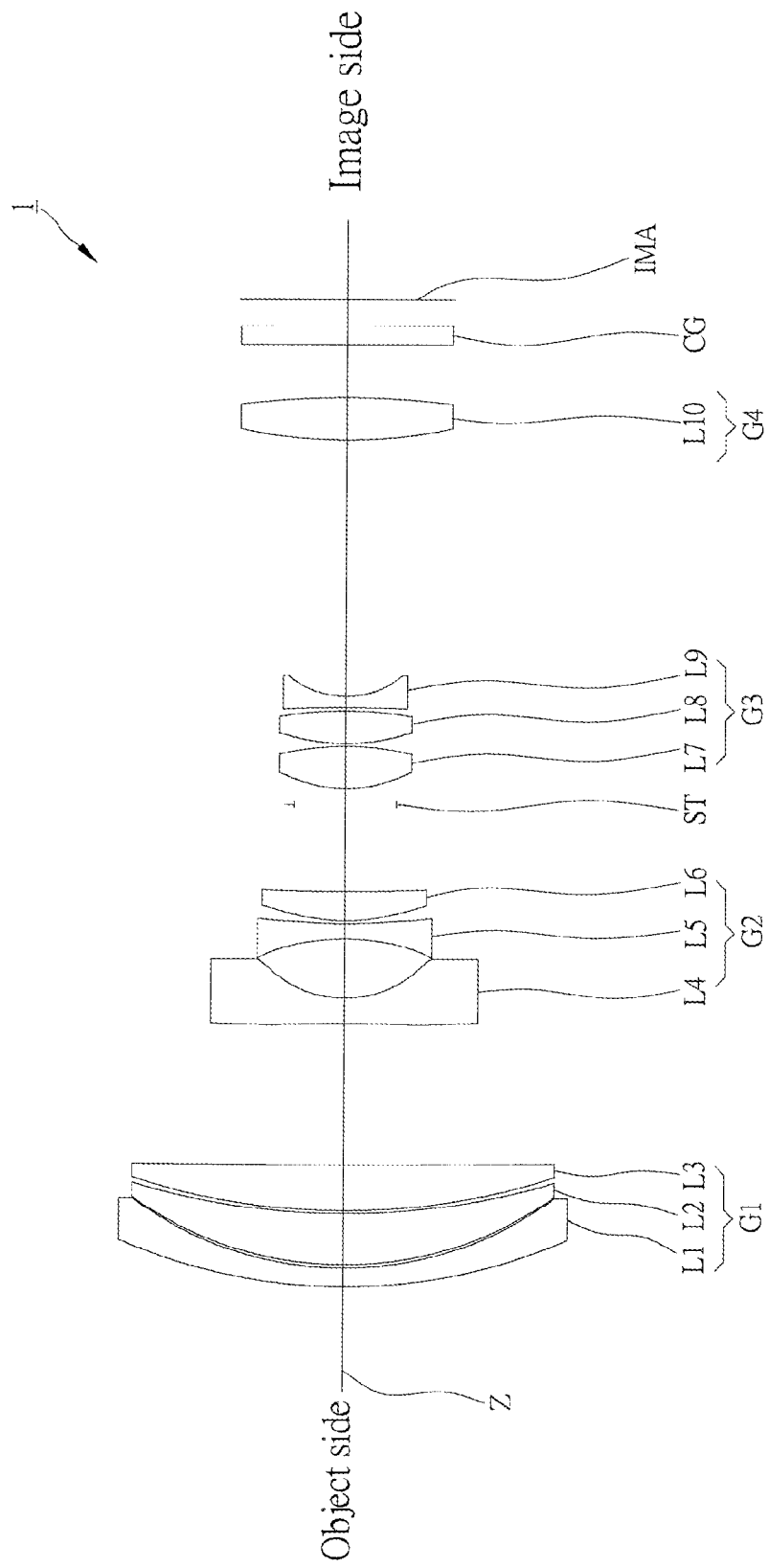
FIG. 2 is a sketch diagram of the arrangement of the lenses of the first preferred embodiment of the present invention in the middle mode.
Figure 3:
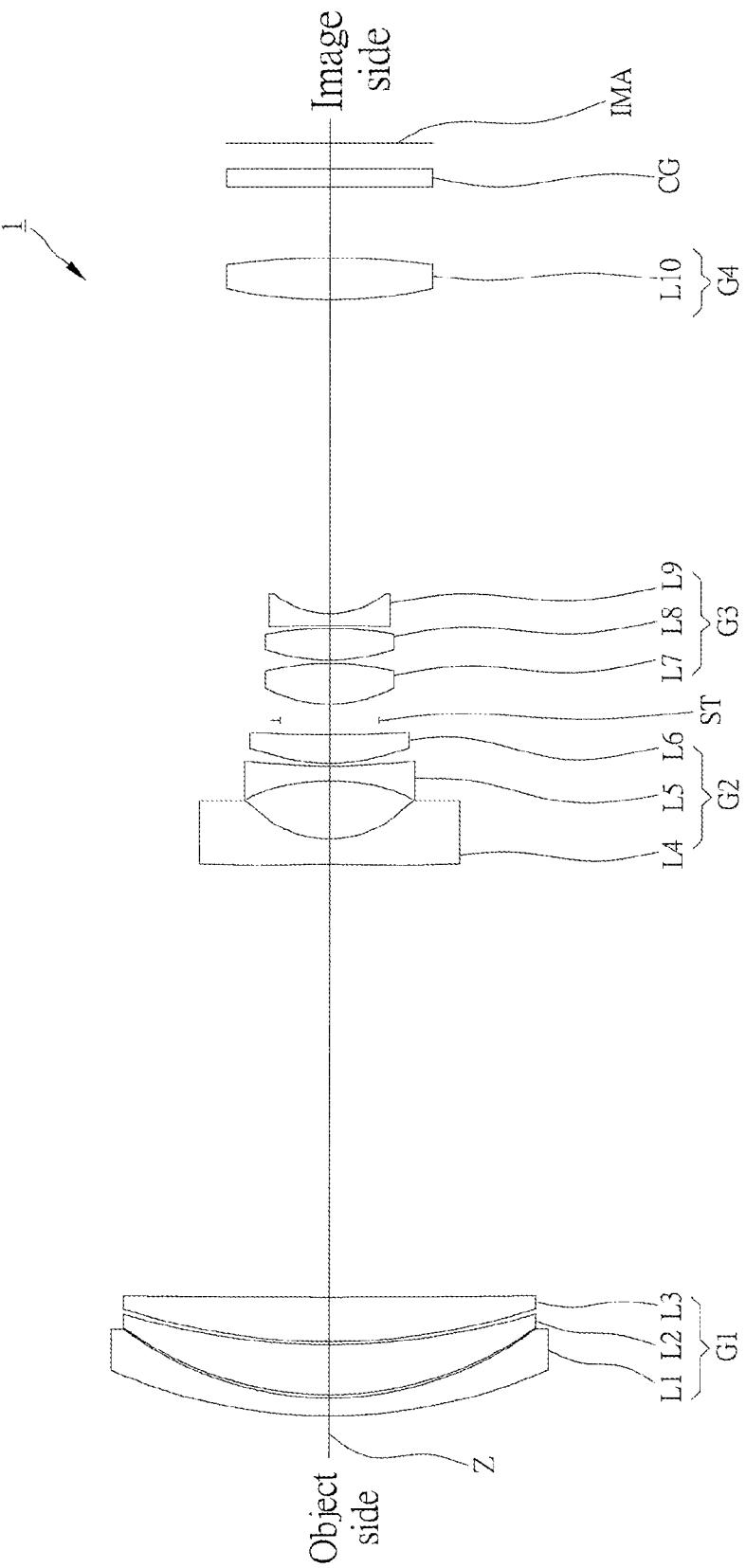
FIG. 3 is a sketch diagram of the arrangement of the lenses of the first preferred embodiment of the present invention in the telephoto mode.

As shown in FIG. 1 to FIG. 3, a zoom lens 1 of the first preferred embodiment of the present includes, along an optical axis Z from an object side to an image side, a first lens group G1, a second lens group G2, an aperture ST, a third lens group G3, a fourth lens group G4, and an image surface IMA. The zoom lens 1 may be switched to a wide-angle mode (FIG. 1), a middle mode (FIG. 2), and a telephoto mode (FIG. 3) by moving the first lens group G1, the second lens group G2, and the third lens group G3. It may be further provided with a cover glass CG, which is a flat glass in the present embodiment, between the fourth lens group G4 and the image surface IMA.

The first lens group G1 has positive refractive power and includes a first lens L1, a second lens L2, and a third lens L3 in sequence from the object side to the image side. The first lens L1 is a meniscus lens with negative refractive power, and its convex surface S1 faces the object side. The second lens L2 is a meniscus lens with positive refractive power, and its convex surface S3 is an aspheric surface and faces the object side. The third lens L3 is a meniscus lens with positive refractive power, and its convex surface S5 faces the object side.

The second lens group G2 has negative refractive power, and includes a fourth lens L4, a fifth lens L5, and a sixth lens L6 in sequence from the object side to the image side. The fourth lens L4 is a biconcave lens with negative refractive power, and both of its concave surfaces S7 and S8 are aspheric surfaces. The fifth lens L5 is a biconcave lens with negative refractive power, and both of its concave surfaces S9 and S10 are aspheric surfaces. The sixth lens L6 is a meniscus lens with positive refractive power, and its convex surface S11 is an aspheric surface, and faces the object side.

The third lens group G3 has positive refractive power and includes a seventh lens L7, an eighth lens L8 and a ninth lens L9 in sequence from the object side to the image side. The seventh lens L7 is a biconvex lens with positive refractive power, and its convex surface S14 facing the object side is an aspheric surface. The eighth lens L8 is a biconvex lens with positive refractive power, and its convex surface S17 facing the object side is an aspheric surface. The ninth lens L9 is a biconcave lens with negative refractive power, and both of its concave surfaces S18 and S19 are aspheric surfaces.

The fourth lens group G4 has positive refractive power and includes a tenth lens L10. The tenth lens L10 is a biconvex lens with positive refractive power, and its convex surfaces S20 facing the object side is an aspheric surface.

As shown in FIG. 1 and FIG. 2, the zoom lens 1 is switched to the middle mode from the wide-angle mode by moving the first lens group G1 toward the object side, moving the second lens group G2 toward the image side, and moving the third lens group G3 toward the object side. As shown in FIG. 2 and FIG. 3, the zoom lens 1 is switched to the telephoto mode from the middle mode by moving the first lens group G1 toward the object side, moving the second lens group G2 toward the object side, and moving the third lens group G3 toward the object side. As shown in FIG. 1 and FIG. 3, the zoom lens 1 is switched to the telephoto mode from the wide-angle mode by moving the first lens group G1 toward the object side, moving the second lens group G2 toward the image side, and moving the third lens group G3 toward the object side. In addition, the fourth lens group G4 is moved toward the object side when the zoom lens 1 is focusing.

In order to obtain a good optical performance, the zoom lens 1 of the present invention has the following features:

$$0.35 \leq (MG1 \cdot fW)/(fT \cdot Y) \leq 0.9 \quad (1)$$

$$0 < |(MG2 \cdot Y)/fG2| \leq 1.0 \quad (2)$$

$$1.3 \leq (fG2 \cdot MG3)/fG1 \leq 1.8 \quad (3)$$

$$1.00 \leq |fG3/fG2| \leq 1.45 \quad (4)$$

wherein

MG1 is the distance of movement of the first lens group G1 when the zoom lens 1 is switched to the telephoto mode from the wide-angle mode;

MG2 is the distance of movement of the second lens group G2 when the zoom lens 1 is switched to the telephoto mode from the wide-angle mode;

MG3 is the distance of movement of the third lens group G3 when the zoom lens 1 is switched to the telephoto mode from the wide-angle mode;

fW is the focus length of the zoom lens 1 in wide-angle mode;

fT is the focus length of the zoom lens 1 in telephoto mode;

fG1 is the focus length of the first lens group G1;

fG2 is the focus length of the second lens group G2;

fG3 is the focus length of the third lens group G3; and

Y is a half of the maximum diagonal of the image surface IMA.

The focus length (F), the half of the maximum diagonal of the image surface IMA (Y), the radius of curvature at the optical axis of each lens (R), the thickness at the optical axis of each lens (T), the refractive index (Nd), and the Abbe number (Vd) of the zoom lens 1 of the present invention is shown in Table 1.

TABLE 1

F = 5.21(W)~11.3(M)~24.5(T) Y = 4.0 mm

| Surface | R (mm) | T (mm) | Nd | Vd | note |
|---|---|---|---|---|---|
| S1 | 21.246 | 0.700 | 1.614220 | 25.6 | L1 |
| S2 | 13.344 | 0.125 | | | |
| S3 | 13.661 | 1.943 | 1.534611 | 56.1 | L2 |
| S4 | 27.673 | 0.110 | | | |
| S5 | 25.734 | 1.737 | 1.534611 | 56.1 | L3 |
| S6 | 581.382 | 0.4933(W)~5.3651(M)~16.7861(T) | | | |
| S7 | −67.775 | 0.967 | 1.534611 | 56.1 | L4 |
| S8 | 4.058 | 2.242 | | | |
| S9 | −8.850 | 0.578 | 1.534611 | 56.1 | L5 |
| S10 | 27.535 | 0.110 | | | |
| S11 | 7.596 | 1.110 | 1.614220 | 25.6 | L6 |
| S12 | 65.648 | 8.7800(W)~3.3017(M)~0.5754(T) | | | |
| S13 | | 0.600 | | | ST |
| S14 | 4.656 | 1.597 | 1.525279 | 56.0 | L7 |
| S15 | −10.900 | 0.120 | | | |
| S16 | 7.509 | 1.219 | 1.525279 | 56.0 | L8 |
| S17 | −16.468 | 0.130 | | | |
| S18 | −53.749 | 0.450 | 1.614220 | 25.6 | L9 |
| S19 | 3.470 | 4.8569(W)~9.7193(M)~12.1809(T) | | | |
| S20 | 19.706 | 1.604 | 1.534611 | 56.1 | L10 |
| S21 | −32.667 | 2.0765(W)~1.9981(M)~2.7586(T) | | | |
| S22 | INF | 0.720 | 1.516330 | 64.1 | CG |
| S23 | INF | 1.000 | | | |

In the column T of Table 1, W indicates the distance between two neighboring surfaces in the optical axis in the wide-angle mode; M indicates the distance between two neighboring surfaces in the optical axis in the middle mode; T indicates the distance between two neighboring surfaces in the optical axis in the telephoto mode.

The depression z of the aspheric surfaces S3, S7, S8, S9, S10, S11, S14, S17, S19, and S20 may be obtained by the following equation:

$$z = \frac{ch^2}{1 + [1 - (k+1)c^2h^2]^{\frac{1}{2}}} + Ah^4 + Bh^6 + Ch^8 + Dh^{10} + Eh^{12} + Fh^{14} + Gh^{16}$$

wherein z is the depression of the aspheric surface;

c is the reciprocal of radius of curvature;

h is the radius of aperture on the surface;

k is conic constant;

A~G are coefficients of the radius of aperture h.

The conic constants of the aspheric surfaces and the coefficients A~G are shown in Table 2.

TABLE 2

| | K | A | B | C | D | E | F | G |
|---|---|---|---|---|---|---|---|---|
| S3 | 0 | −7.94481E−06 | −9.10686E−07 | 3.46781E−08 | −7.09106E−10 | 7.12448E−12 | −2.80563E−14 | 0 |
| S7 | 124.49267 | 2.28113E−04 | 2.80926E−05 | −2.27113E−06 | 3.71993E−08 | 1.29997E−09 | −5.24357E−11 | 0 |
| S8 | −0.28011 | −8.62651E−04 | 1.32450E−04 | 9.28600E−06 | −3.01943E−06 | 3.39971E−07 | −2.87729E−08 | 0 |

TABLE 2-continued

|  | K | A | B | C | D | E | F | G |
|---|---|---|---|---|---|---|---|---|
| S9 | 0 | −4.45402E−03 | 9.05402E−04 | −1.18169E−04 | 8.05230E−06 | −2.80914E−08 | −2.83978E−08 | 0 |
| S10 | 0 | −4.39204E−03 | 1.28037E−03 | −1.86429E−04 | 7.84773E−06 | 9.43603E−07 | −9.92571E−08 | 0 |
| S11 | 0 | −7.72286E−04 | 2.31228E−04 | −2.27481E−05 | −6.61858E−06 | 1.46339E−06 | −1.01106E−07 | 0 |
| S14 | 0 | −1.56489E−03 | −7.31846E−05 | 2.61292E−05 | −8.03981E−06 | 9.82385E−07 | 0 | 0 |
| S17 | 0 | 3.22799E−03 | 1.21805E−03 | −6.04966E−04 | 1.01357E−04 | −4.45642E−06 | 0 | 0 |
| S18 | 0 | −6.00151E−03 | 5.07728E−03 | −1.87418E−03 | 3.14715E−04 | −1.73365E−05 | 0 | 0 |
| S19 | 0 | 7.61035E−03 | 4.12486E−03 | −1.38012E−03 | 2.17274E−04 | −1.17639E−05 | 0 | 0 |
| S20 | 4.045196863 | −2.12595E−04 | 4.38293E−05 | −3.48035E−06 | 1.35835E−07 | −2.14237E−09 | 0 | 0 |

The lenses and the apertures ST as described above may reduce the size of the zoom lens 1 of the present invention. The zoom lens 1 still has a good optical performance in the wide-angle mode as shown in FIG. 4A to FIG. 4D.

Figure 4A:
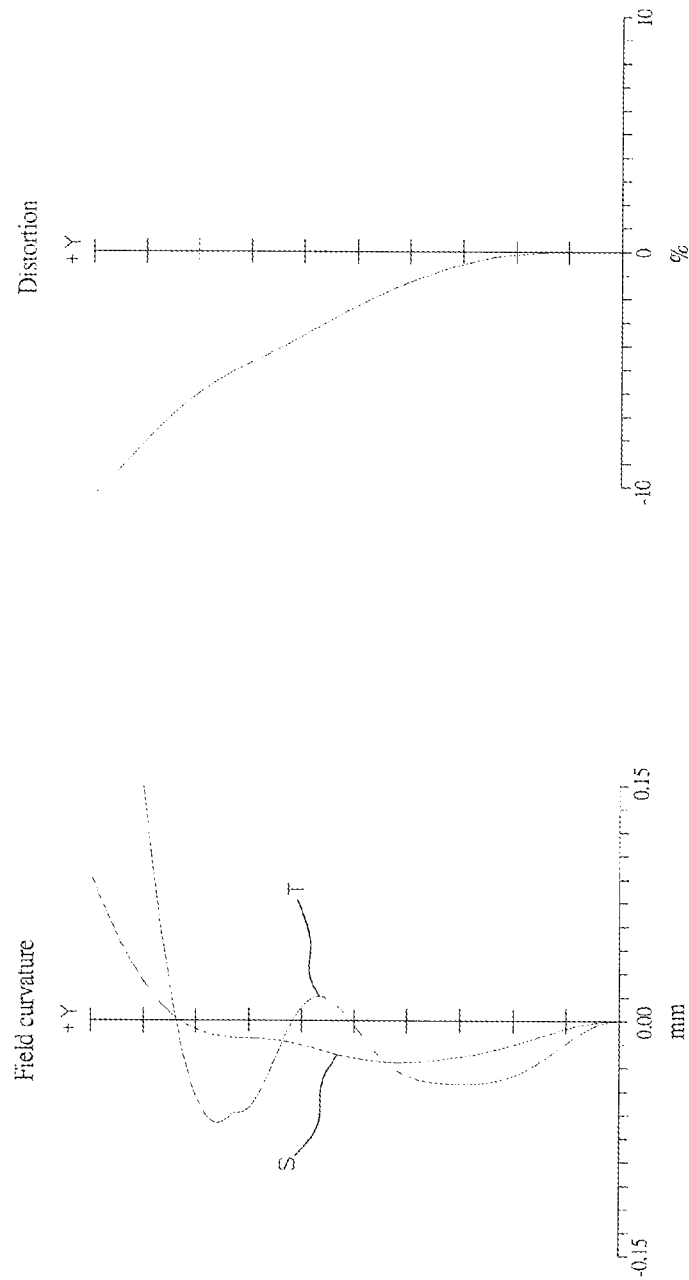
FIG. 4A is a field curvature diagram and a distortion diagram of the first preferred embodiment of the present invention in the wide-angle mode.
Figure 4:
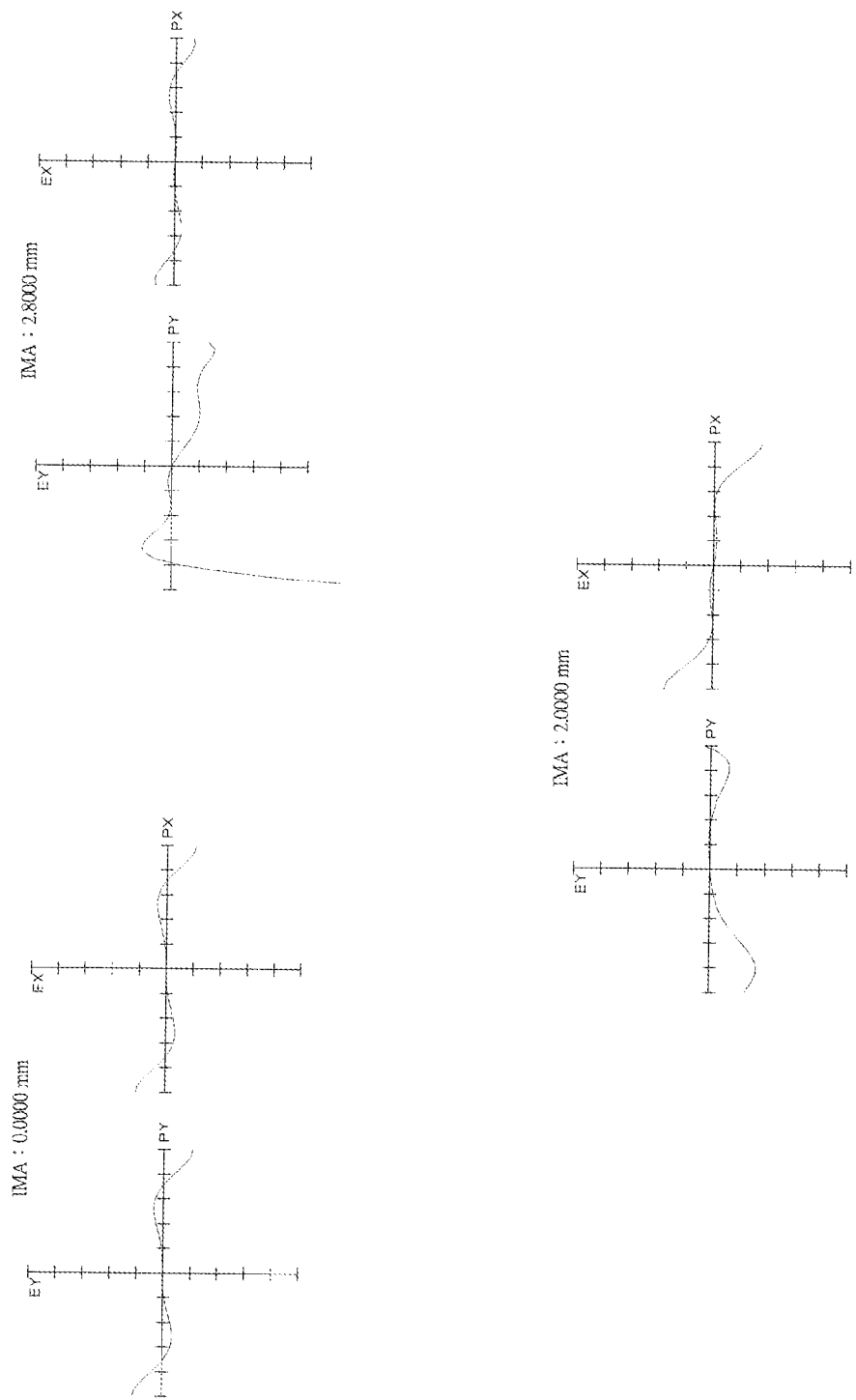
FIG. 4B is a transverse chromatic aberration diagram of the first preferred embodiment of the present invention in the wide-angle mode.
FIG. 4C is a spherical aberration diagram of the first preferred embodiment of the present invention in the wide-angle mode.
FIG. 4D is a coma aberration diagram of the first preferred embodiment of the present invention in the wide-angle mode.

In FIG. 4A, it shows that the maximum field curvature is about 0.15 mm and −0.09 mm, and the maximum distortion is about −10%. In FIG. 4B, it shows that the maximum transverse chromatic aberration is about 3 μm. FIG. 4C shows that the maximum spherical aberration is about 0.04 mm and −0.08 mm. FIG. 4D shows that all the coma aberrations of the zoom lens 1 are acceptable.

Figure 5A:
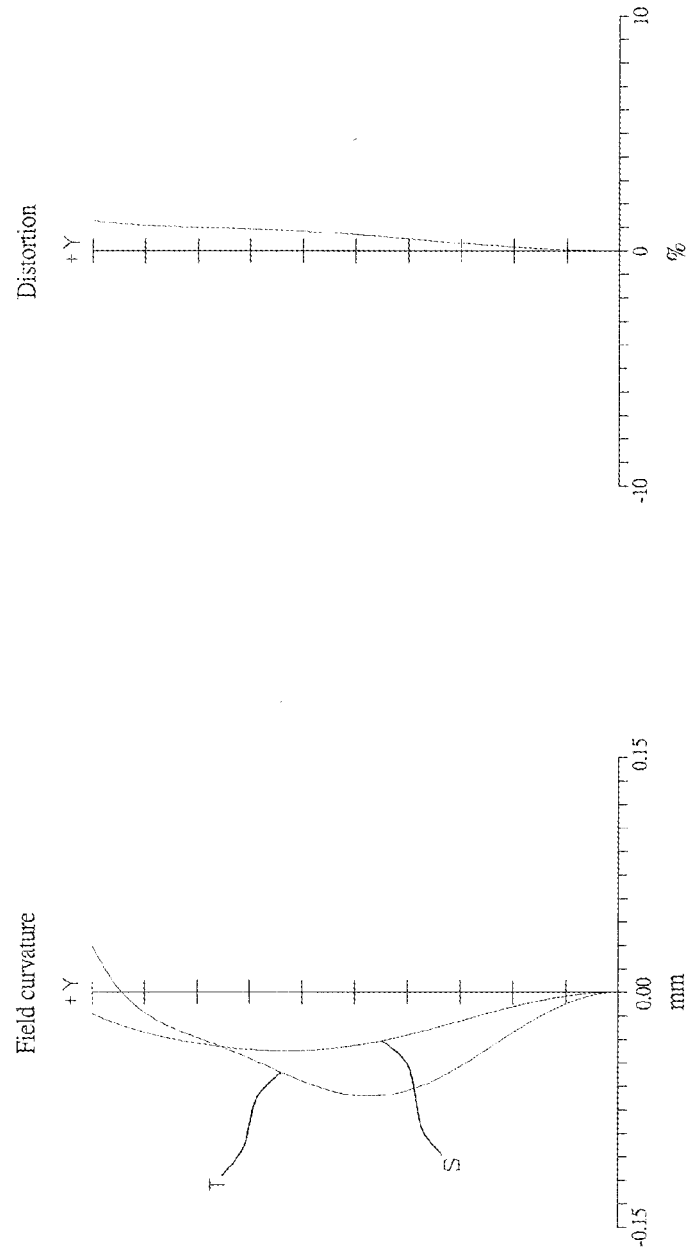
FIG. 5A is a field curvature diagram and a distortion diagram of the first preferred embodiment of the present invention in the middle mode.
Figure 5:
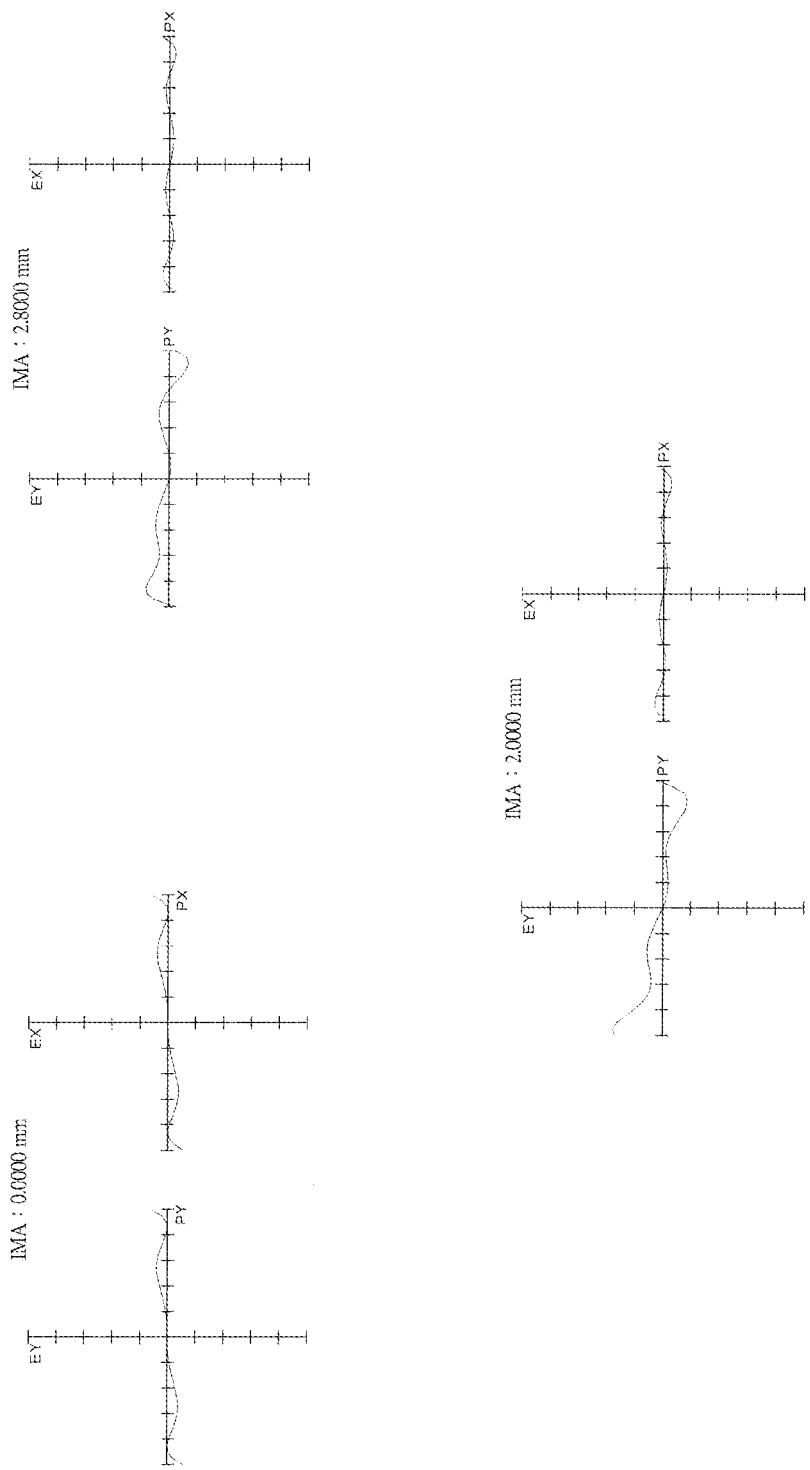
FIG. 5B is a transverse chromatic aberration diagram of the first preferred embodiment of the present invention in the middle mode.
FIG. 5C is a spherical aberration diagram of the first preferred embodiment of the present invention in the middle mode.
FIG. 5D is a coma aberration diagram of the first preferred embodiment of the present invention in the middle mode.

In the middle mode, the zoom lens 1 of the present invention has a good optical performance also. FIG. 5A shows the maximum field curvature is about 0.03 mm and −0.075 mm, and the maximum distortion is about 1%. In FIG. 5B, it shows that the maximum transverse chromatic aberration is about −1 μm. FIG. 5C shows that the maximum spherical aberration is about 0.06 mm and −0.05 mm. FIG. 5D shows that all the coma aberrations of the zoom lens 1 are acceptable.

Figure 6:
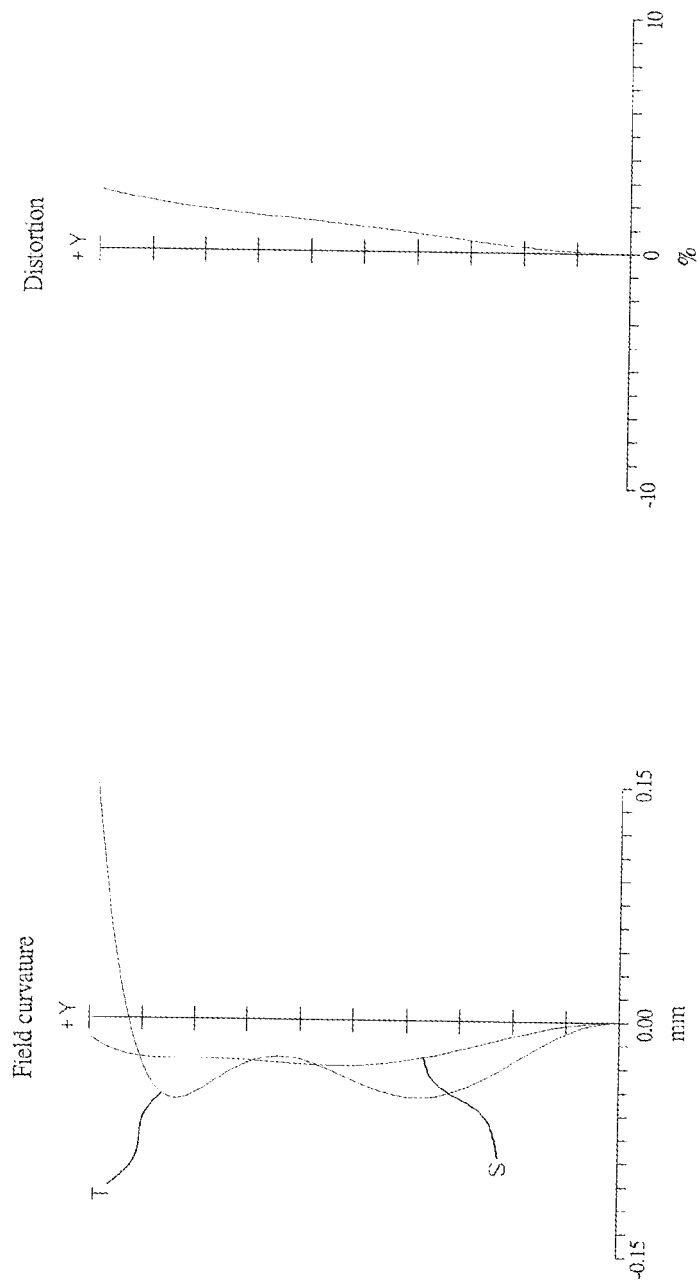
FIG. 6A is a field curvature diagram and a distortion diagram of the first preferred embodiment of the present invention in the telephoto mode.
FIG. 6B is a transverse chromatic aberration diagram of the first preferred embodiment of the present invention in the telephoto mode.
FIG. 6C is a spherical aberration diagram of the first preferred embodiment of the present invention in the telephoto mode.
FIG. 6D is a coma aberration diagram of the first preferred embodiment of the present invention in the telephoto mode.
Figure 6:
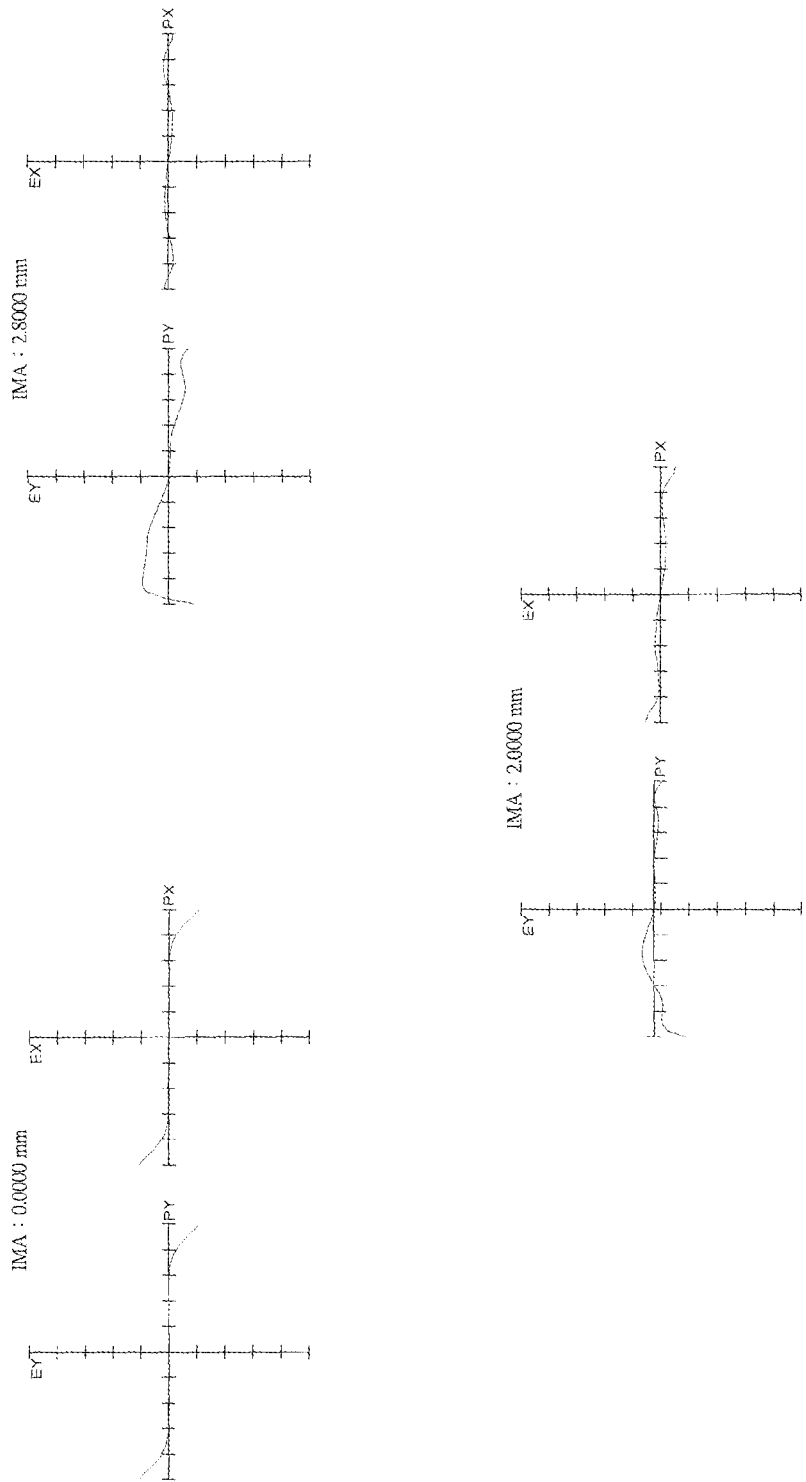

In the telephoto mode, FIG. 6A shows the maximum field curvature is about 0.15 mm and −0.06 mm, and the maximum distortion is about 3%. In FIG. 6B, it shows that the maximum transverse chromatic aberration is about −5 μm. FIG. 6C shows that the maximum spherical aberration is about 0.04 mm and −0.1 mm. FIG. 6D shows that all the coma aberrations of the zoom lens 1 are acceptable.

Second Preferred Embodiment

Figure 7:
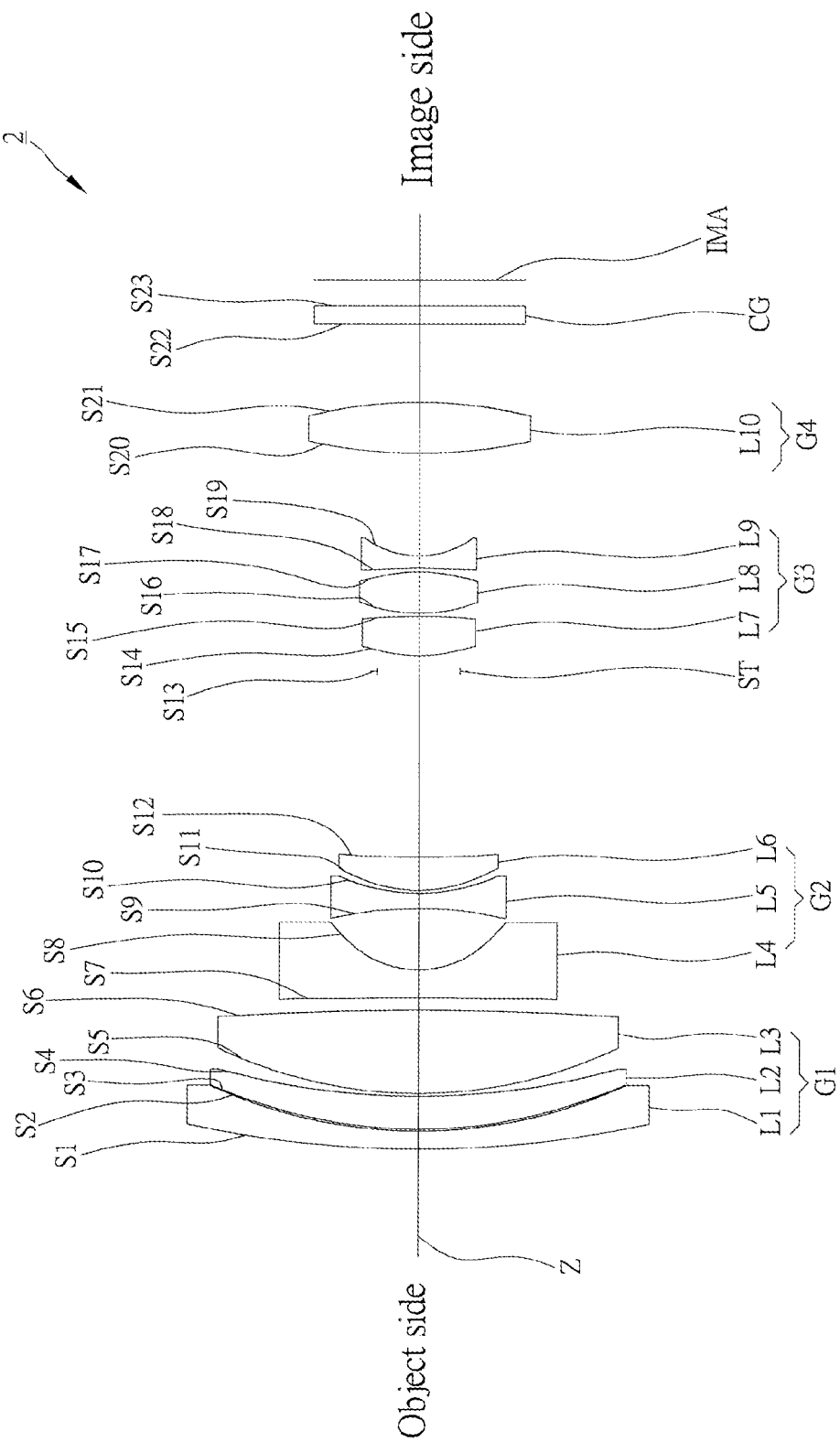
FIG. 7 is a sketch diagram of the arrangement of the lenses of a second preferred embodiment of the present invention in the wide-angle mode.
Figure 8:
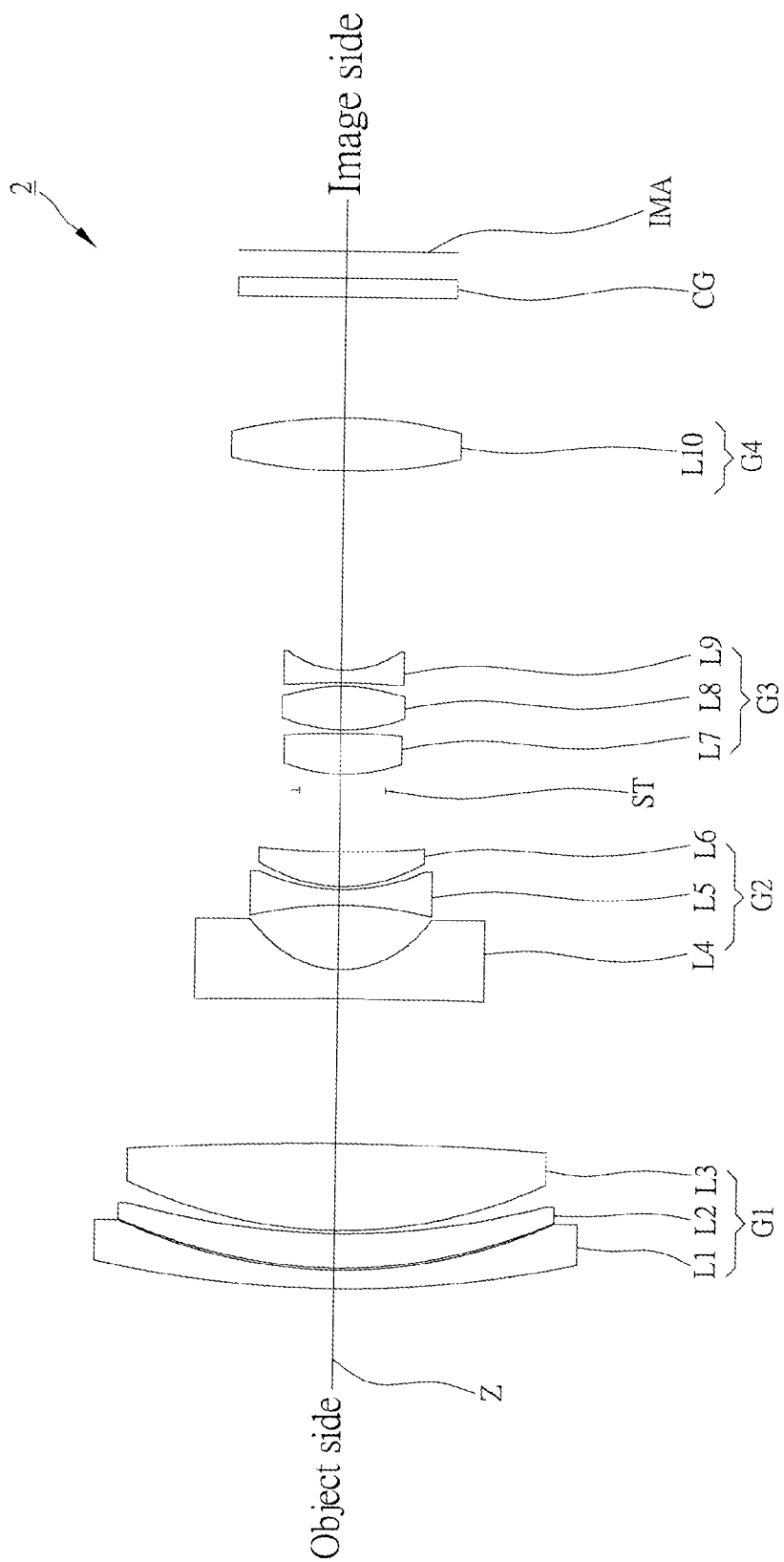
FIG. 8 is a sketch diagram of the arrangement of the lenses of the second preferred embodiment of the present invention in the middle mode.
Figure 9:
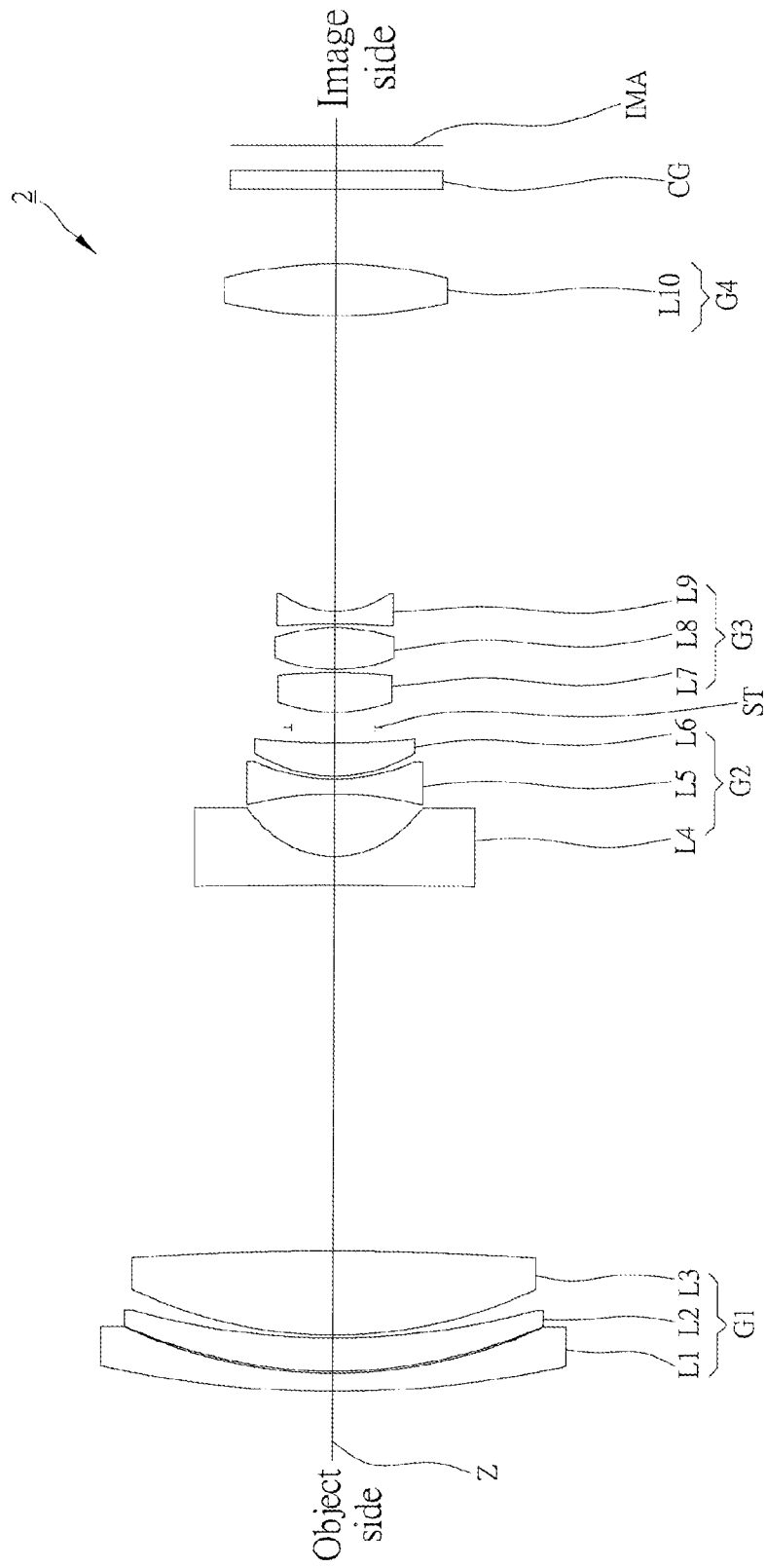
FIG. 9 is a sketch diagram of the arrangement of the lenses of the second preferred embodiment of the present invention in the telephoto mode.

As shown in FIG. 7 to FIG. 9, a zoom lens 2 of the second preferred embodiment of the present invention includes, along an optical axis Z from an object side to an image side, a first lens group G1, a second lens group G2, an aperture ST, a third lens group G3, a fourth lens group G4, and an image surface IMA. The zoom lens 2 may be switched to a wide-angle mode (FIG. 7), a middle mode (FIG. 8), and a telephoto mode (FIG. 9) by moving the first lens group G1, the second lens group G2, and the third lens group G3. It may be further provided with a cover glass CG, which is a flat glass in the present embodiment, between the fourth lens group G4 and the image surface IMA.

The first lens group G1 has positive refractive power and includes a first lens L1, a second lens L2, and a third lens L3 in sequence from the object side to the image side. The first lens L1 is a meniscus lens with negative refractive power, and its convex surface S1 faces the object side. The second lens L2 is a meniscus lens with positive refractive power, and its convex surface S3 is an aspheric surface and faces the object side. The third lens L3 is a biconvex lens with positive refractive power.

The second lens group G2 has negative refractive power, and includes a fourth lens L4, a fifth lens L5, and a sixth lens L6 in sequence from the object side to the image side. The fourth lens L4 is a biconcave lens with negative refractive power, and both of its concave surfaces S7 and S8 are aspheric surfaces. The fifth lens L5 is a biconcave lens with negative refractive power, and both of its concave surfaces S9 and S10 are aspheric surfaces. The sixth lens L6 is a meniscus lens with positive refractive power, and its convex surface S11 is an aspheric surface and faces the object side.

The third lens group G3 has positive refractive power, and includes a seventh lens L7, an eighth lens L8, and a ninth lens L9 in sequence from the object side to the image side. The seventh lens L7 is a biconvex lens with positive refractive power, and its concave surface S14 is an aspheric surface and faces the object side. The eighth lens L8 is a biconvex lens with positive refractive power, and its convex surface S17 is an aspheric surface and faces the object side. The ninth lens L9 is a biconcave lens with negative refractive power, and both of its concave surfaces S18 and S19 are aspheric surfaces.

The fourth lens group G4 has positive refractive power and includes a tenth lens L10. The tenth lens L10 is a biconvex lens with positive refractive power, and its convex surfaces S20 facing the object side is an aspheric surface.

As shown in FIG. 7 and FIG. 8, the zoom lens 2 is switched to the middle mode from the wide-angle mode by moving the first lens group G1 toward the object side, moving the second lens group G2 toward the image side, and moving the third lens group G3 toward the object side. As shown in FIG. 8 and FIG. 9, the zoom lens 2 is switched to the telephoto mode from the middle mode by moving the first lens group G1 toward the object side, moving the second lens group G2 toward the object side, and moving the third lens group G3 toward the object side. As shown in FIG. 7 and FIG. 9, the zoom lens 2 is switched to the telephoto mode from the wide-angle mode by moving the first lens group G1 toward the object side, moving the second lens group G2 toward the image side, and moving the third lens group G3 toward the object side. In addition, the fourth lens group G4 is moved toward the object side when the zoom lens 2 is focusing.

In order to obtain a good optical performance, the zoom lens 2 of the present invention has the following features:

$$0.35 \leq (MG1 \cdot fW)/(fT \cdot Y) \leq 0.9 \tag{1}$$

$$0 < |(MG2 \cdot Y)/fG2| \leq 1.0 \tag{2}$$

$$1.3 \leq (fG2 \cdot MG3)/fG1 \leq 1.8 \tag{3}$$

$$1.00 \leq |fG3/fG2| \leq 1.45 \tag{4}$$

wherein

MG1 is the distance of movement of the first lens group G1 when the zoom lens 2 is switched to the telephoto mode from the wide-angle mode;

MG2 is the distance of movement of the second lens group G2 when the zoom lens 2 is switched to the telephoto mode from the wide-angle mode;

MG3 is the distance of movement of the third lens group G3 when the zoom lens 2 is switched to the telephoto mode from the wide-angle mode;

fW is the focus length of the zoom lens 2 in wide-angle mode;

fT is the focus length of the zoom lens 2 in telephoto mode;

fG1 is the focus length of the first lens group G1;

fG2 is the focus length of the second lens group G2;

fG3 is the focus length of the third lens group G3; and

Y is a half of the maximum diagonal of the image surface IMA.

The focus length (F), the a half of the maximum diagonal of the image surface IMA (Y), the radius of curvature at the optical axis of each lens (R), the thickness at the optical axis of each lens (T), the refractive index (Nd), and the Abbe number (Vd) of the zoom lens 2 of the present invention is shown in Table 3.

TABLE 3

F = 5.14(W)~11.2(M)~24.2(T) Y = 4.0 mm

| Surface | R (mm) | T (mm) | Nd | Vd | note |
|---|---|---|---|---|---|
| S1 | 41.777 | 0.700 | 1.761821 | 26.5 | L1 |
| S2 | 19.221 | 0.070 | | | |
| S3 | 18.863 | 1.290 | 1.534611 | 56.1 | L2 |
| S4 | 29.068 | 0.110 | | | |
| S5 | 18.034 | 3.245 | 1.518229 | 58.9 | L3 | indicates the distance between two neighboring surfaces in the optical axis in the telephoto mode.

The depression z of the aspheric surfaces S3, S7, S8, S9, S10, S11, S14, S17, S18, S19, and S20 may be obtained by the following equation:

$$z = \frac{ch^2}{1 + [1-(k+1)c^2h^2]^{\frac{1}{2}}} + Ah^4 + Bh^6 + Ch^8 + Dh^{10} + Eh^{12} + Fh^{14} + Gh^{16}$$

wherein z is the depression of the aspheric surface;

c is the reciprocal of radius of curvature;

h is the radius of aperture on the surface;

k is conic constant;

A~G are coefficients of the radius of aperture h.

The conic constants of the aspheric surfaces and the coefficients A~G are shown in Table 4.

TABLE 4

| | K | A | B | C | D | E | F | G |
|---|---|---|---|---|---|---|---|---|
| S3 | 0 | −7.94481E−06 | −9.10686E−07 | 3.46781E−08 | −7.09106E−10 | 7.12448E−12 | −2.80563E−14 | 0 |
| S7 | 124.49267 | 2.28113E−04 | 2.80926E−05 | −2.27113E−06 | 3.71993E−08 | 1.29997E−09 | −5.24357E−11 | 0 |
| S8 | −0.28011 | −8.62651E−04 | 1.32450E−04 | 9.28600E−06 | −3.01943E−06 | 3.39971E−07 | −2.87729E−08 | 0 |
| S9 | 0 | −4.45402E−03 | 9.05402E−04 | −1.18169E−04 | 8.05230E−06 | −2.80914E−08 | −2.83978E−08 | 0 |
| S10 | 0 | −4.39204E−03 | 1.28037E−03 | −1.86429E−04 | 7.84773E−06 | 9.43603E−07 | −9.92571E−08 | 0 |
| S11 | 0 | −7.72286E−04 | 2.31228E−04 | −2.27481E−05 | −6.61858E−06 | 1.46339E−06 | −1.01106E−07 | 0 |
| S14 | 0 | −1.56489E−03 | −7.31846E−05 | 2.61292E−05 | −8.03981E−06 | 9.82385E−07 | 0 | 0 |
| S17 | 0 | 3.22799E−03 | 1.21805E−03 | −6.04966E−04 | 1.01357E−04 | −4.45642E−06 | 0 | 0 |
| S18 | 0 | −6.00151E−03 | 5.07728E−03 | −1.87418E−03 | 3.14715E−04 | −1.73365E−05 | 0 | 0 |
| S19 | 0 | −7.61035E−03 | 4.12486E−03 | −1.38012E−03 | 2.17274E−04 | −1.17639E−05 | 0 | 0 |
| S20 | 4.045196863 | −2.12595E−04 | 4.38293E−05 | −3.48035E−06 | 1.35835E−07 | −2.14237E−09 | 0 | 0 |

TABLE 3-continued

F = 5.14(W)~11.2(M)~24.2(T) Y = 4.0 mm

| Surface | R (mm) | T (mm) | Nd | Vd | note |
|---|---|---|---|---|---|
| S6 | −116.399 | 0.4800(W)~5.3988(M)~14.1357(T) | | | |
| S7 | −80.579 | 1.091 | 1.534611 | 56.1 | L4 |
| S8 | 3.713 | 2.393 | | | |
| S9 | −20.784 | 0.593 | 1.534611 | 56.1 | L5 |
| S10 | 6.855 | 0.110 | | | |
| S11 | 5.609 | 1.288 | 1.614220 | 25.6 | L6 |
| S12 | 34.076 | 7.2618(W)~2.2993(M)~0.5754(T) | | | |
| S13 | | 0.600 | | | ST |
| S14 | 5.981 | 1.533 | 1.525279 | 56.0 | L7 |
| S15 | −25.218 | 0.120 | | | |
| S16 | 6.276 | 1.628 | 1.525279 | 56.0 | L8 |
| S17 | −5.687 | 0.130 | | | |
| S18 | −30.070 | 0.478 | 1.614220 | 25.6 | L9 |
| S19 | 3.371 | 4.0052(W)~7.4107(M)~11.4207(T) | | | |
| S20 | 20.511 | 1.985 | 1.534611 | 56.1 | L10 |
| S21 | −17.500 | 3.0335(W)~4.4923(M)~2.8798(T) | | | |
| S22 | INF | 0.720 | 1.516330 | 64.1 | CG |
| S23 | INF | 1.000 | | | |

In the column T of Table 3, W indicates the distance between two neighboring surfaces in the optical axis in the wide-angle mode; M indicates the distance between two neighboring surfaces in the optical axis in the middle mode; T The lenses and the apertures ST as described above may reduce the size of the zoom lens 2 of the present invention. The zoom lens 2 still has a good optical performance in the wide-angle mode as shown in FIG. 10A to FIG. 10D.

Figure 10A:
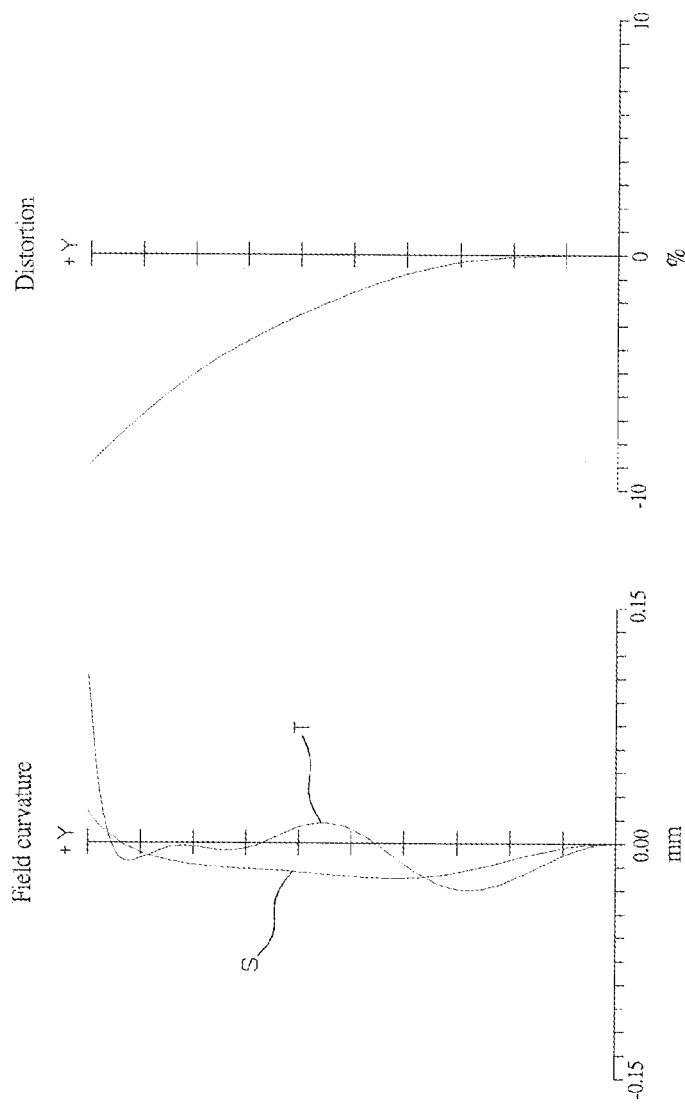
FIG. 10A is a field curvature diagram and a distortion diagram of the second preferred embodiment of the present invention in the wide-angle mode.
Figure 10D:
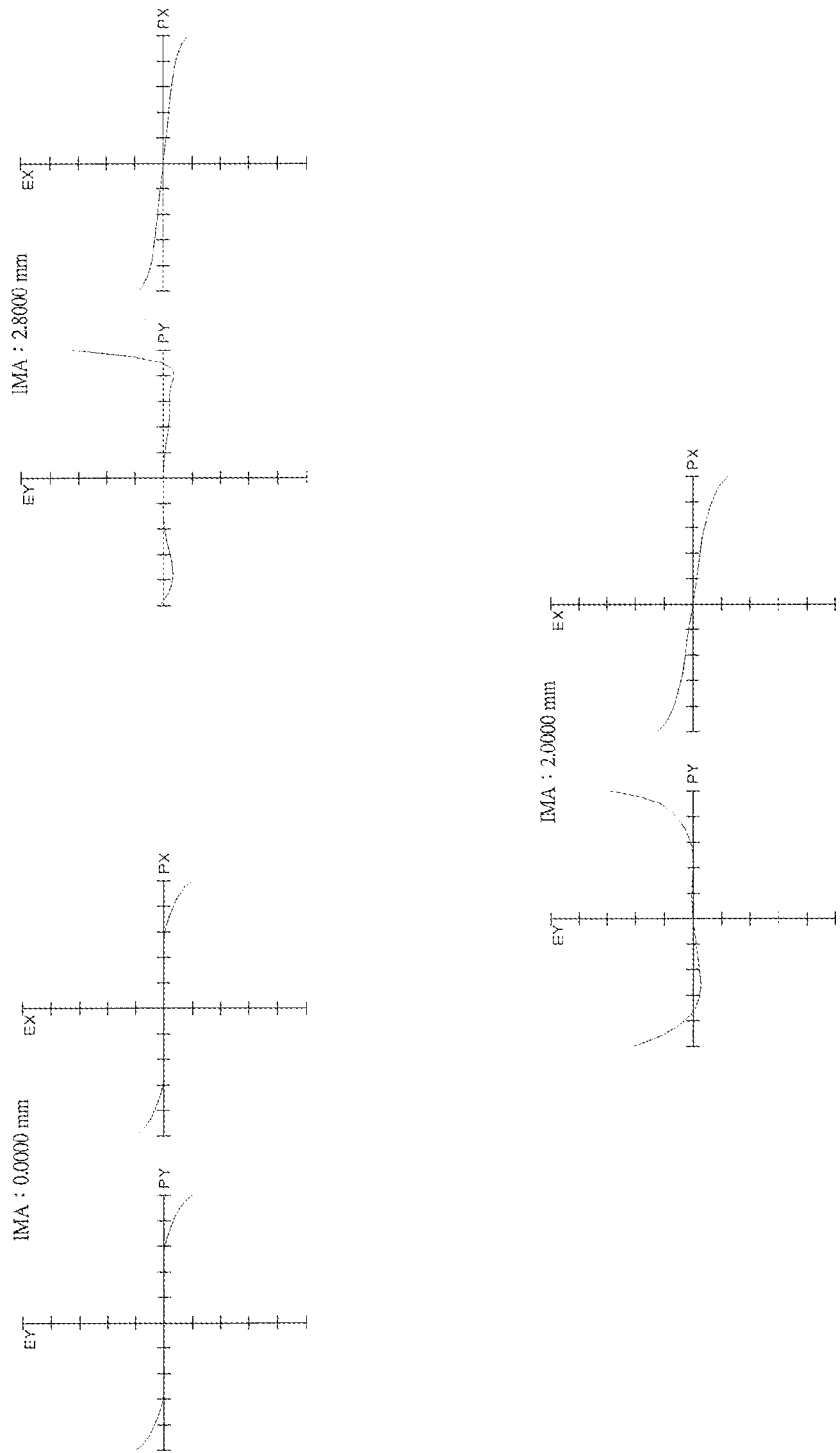
FIG. 10D is a coma aberration diagram of the second preferred embodiment of the present invention in the wide-angle mode.

In FIG. 10A, it shows that the maximum field curvature is about 0.12 mm and −0.045 mm, and the maximum distortion is about −9%. In FIG. 10B, it shows that the maximum transverse chromatic aberration is about 2 μm. FIG. 10C shows that the maximum spherical aberration is about 0.015 mm and −0.05 mm. FIG. 10D shows that all the coma aberrations of the zoom lens 2 are acceptable.

Figure 11A:
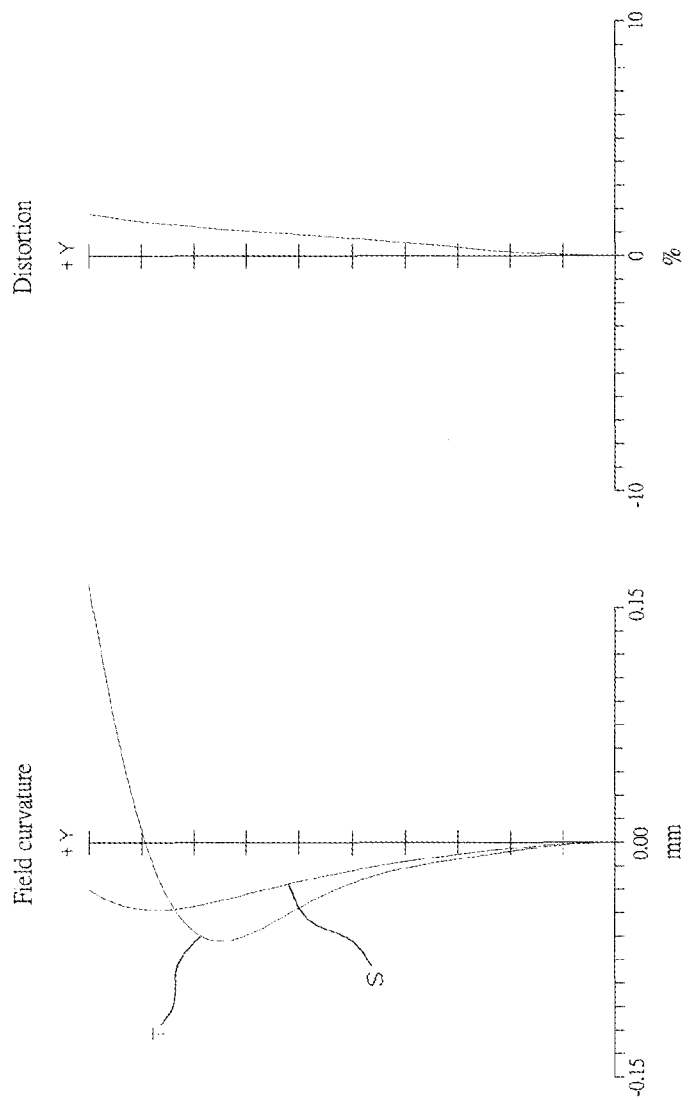
FIG. 11A is a field curvature diagram and a distortion diagram of the second preferred embodiment of the present invention in the middle mode.
Figure 11D:
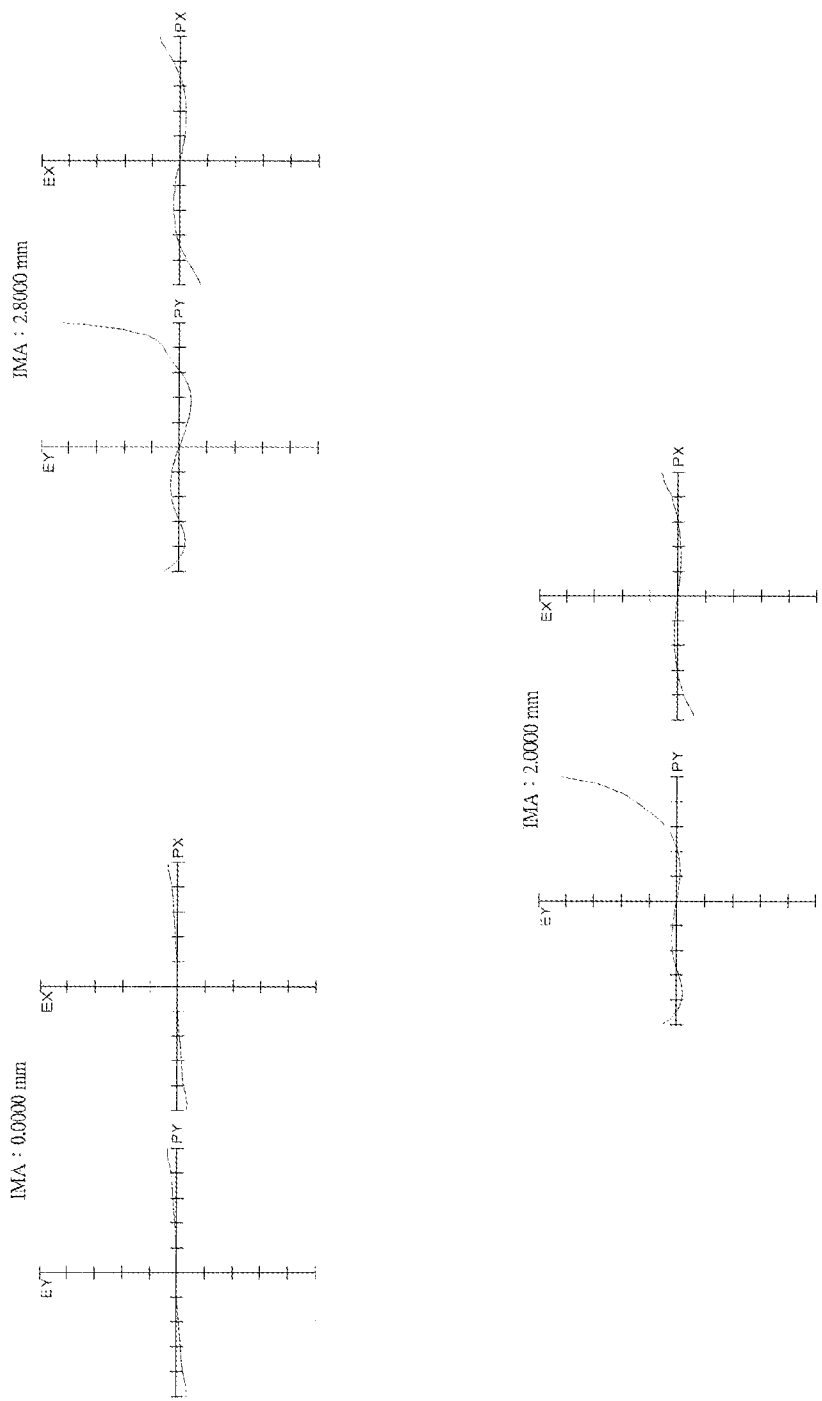
FIG. 11D is a coma aberration diagram of the second preferred embodiment of the present invention in the middle mode.

In the middle mode, the zoom lens 2 of the present invention has a good optical performance also. FIG. 11A shows the maximum field curvature is about 0.15 mm and −0.06 mm, and the maximum distortion is about 2%. In FIG. 11B, it shows that the maximum transverse chromatic aberration is about 4 μm. FIG. 11C shows that the maximum spherical aberration is about 0.045 mm and −0.02 mm. FIG. 11D shows that all the coma aberrations of the zoom lens 2 are acceptable.

Figure 12A:
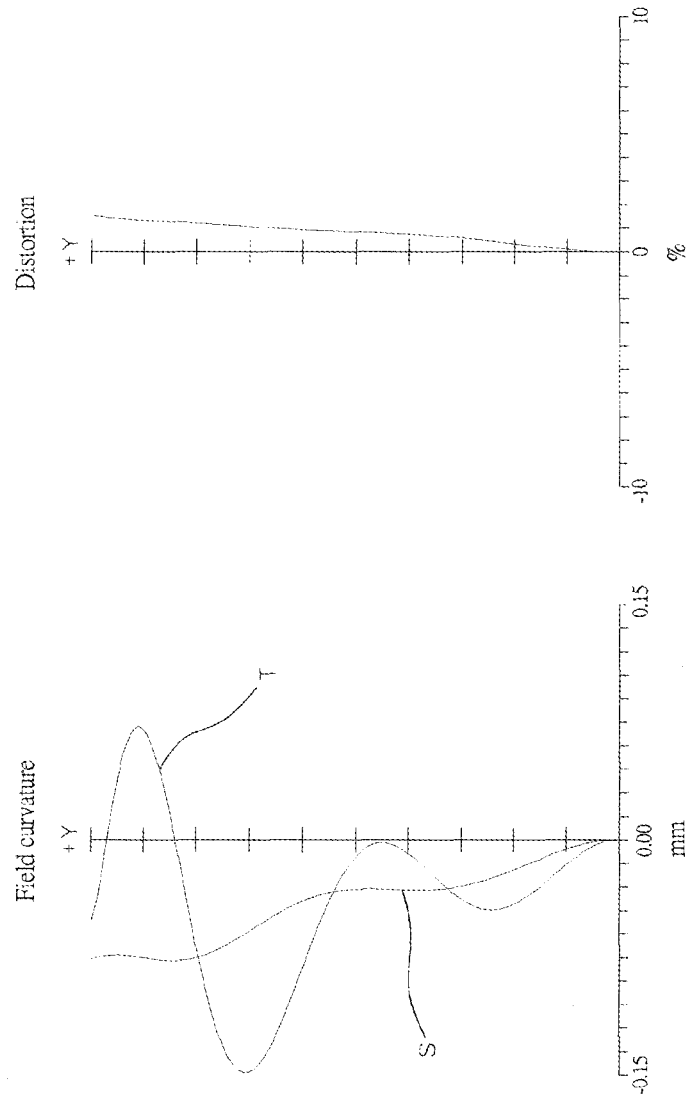
FIG. 12A is a field curvature diagram and a distortion diagram of the second preferred embodiment of the present invention in the telephoto mode.
Figures 12B, 12C:
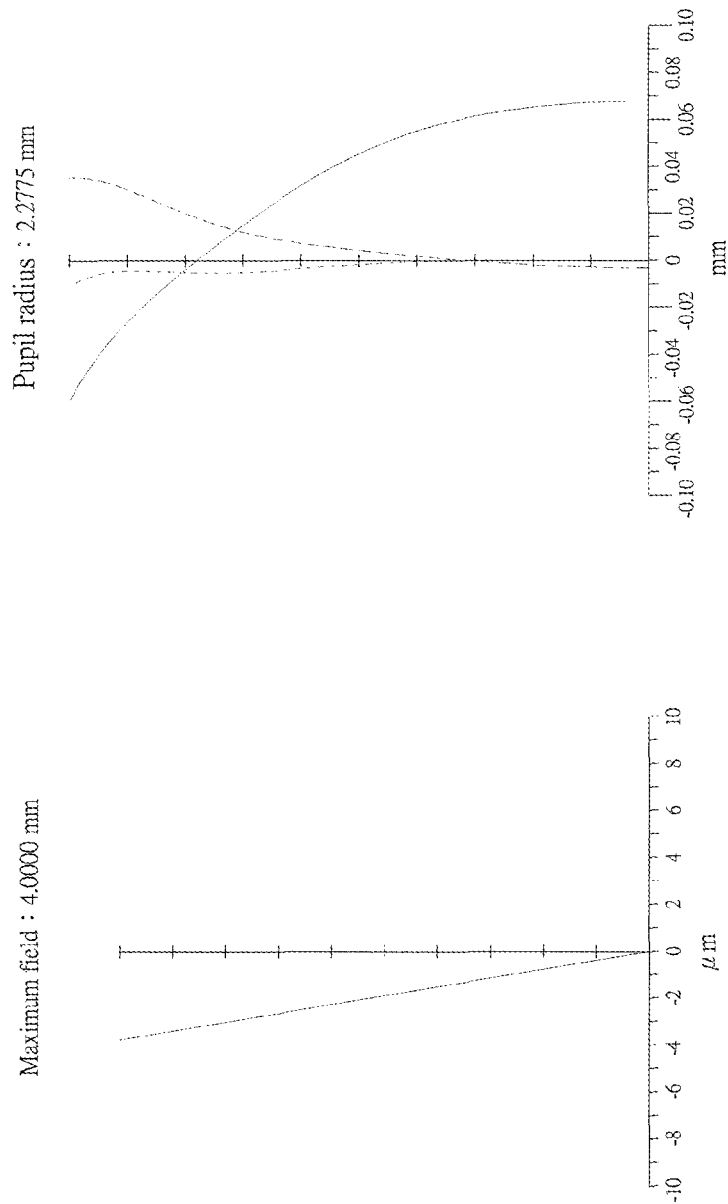
FIG. 12B is a transverse chromatic aberration diagram of the second preferred embodiment of the present invention in the telephoto mode.
FIG. 12C is a spherical aberration diagram of the second preferred embodiment of the present invention in the telephoto mode.
Figure 12D:
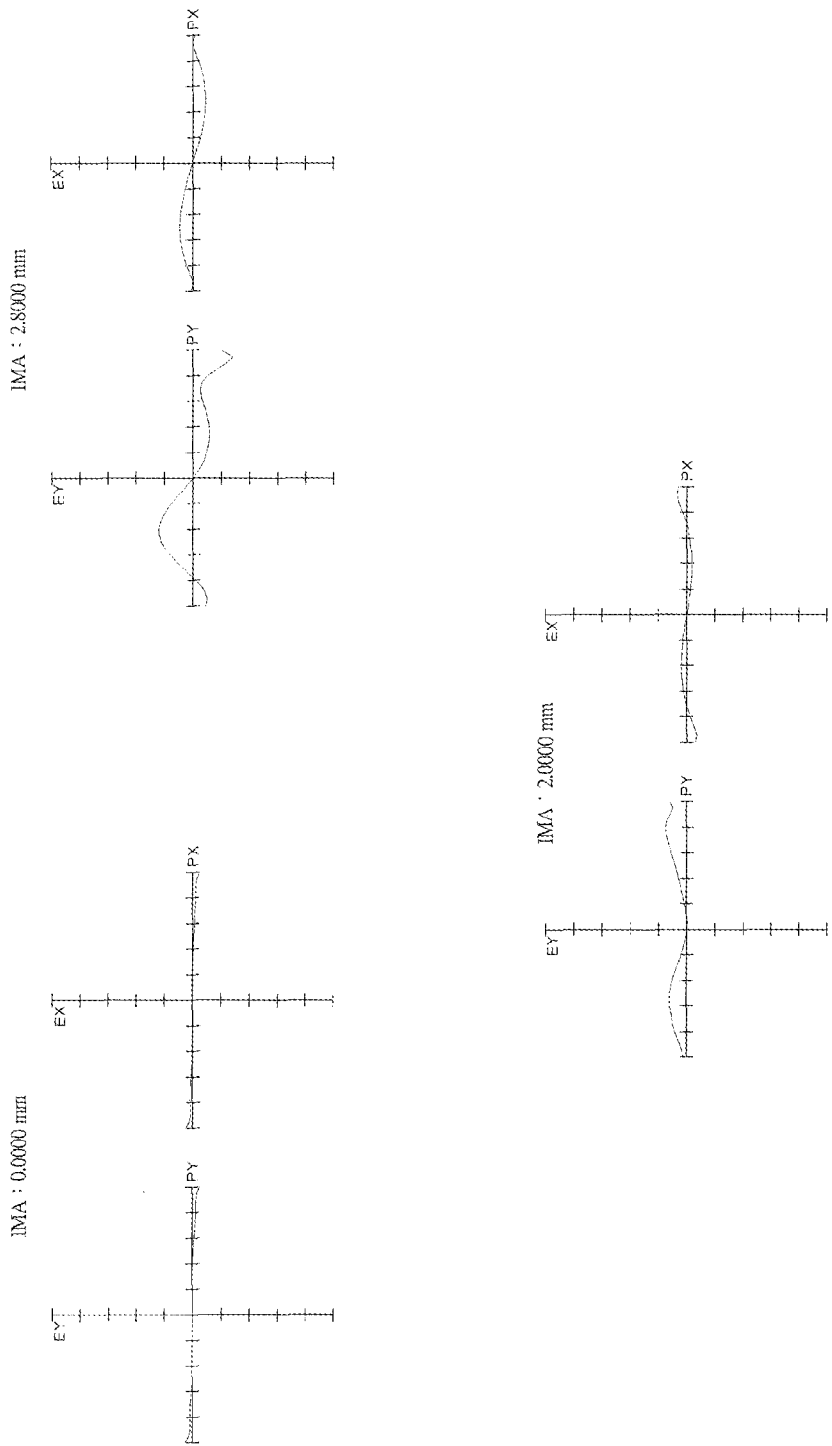
FIG. 12D is a coma aberration diagram of the second preferred embodiment of the present invention in the telephoto mode.

In the telephoto mode, FIG. 12A shows the maximum field curvature is about 0.075 mm and −0.15 mm, and the maximum distortion is about 2%. In FIG. 12B, it shows that the maximum transverse chromatic aberration is about −4 μm. FIG. 12C shows that the maximum spherical aberration is about 0.07 mm and −0.06 mm. FIG. 12D shows that all the coma aberrations of the zoom lens 2 are acceptable.

Third Preferred Embodiment

Figure 13:
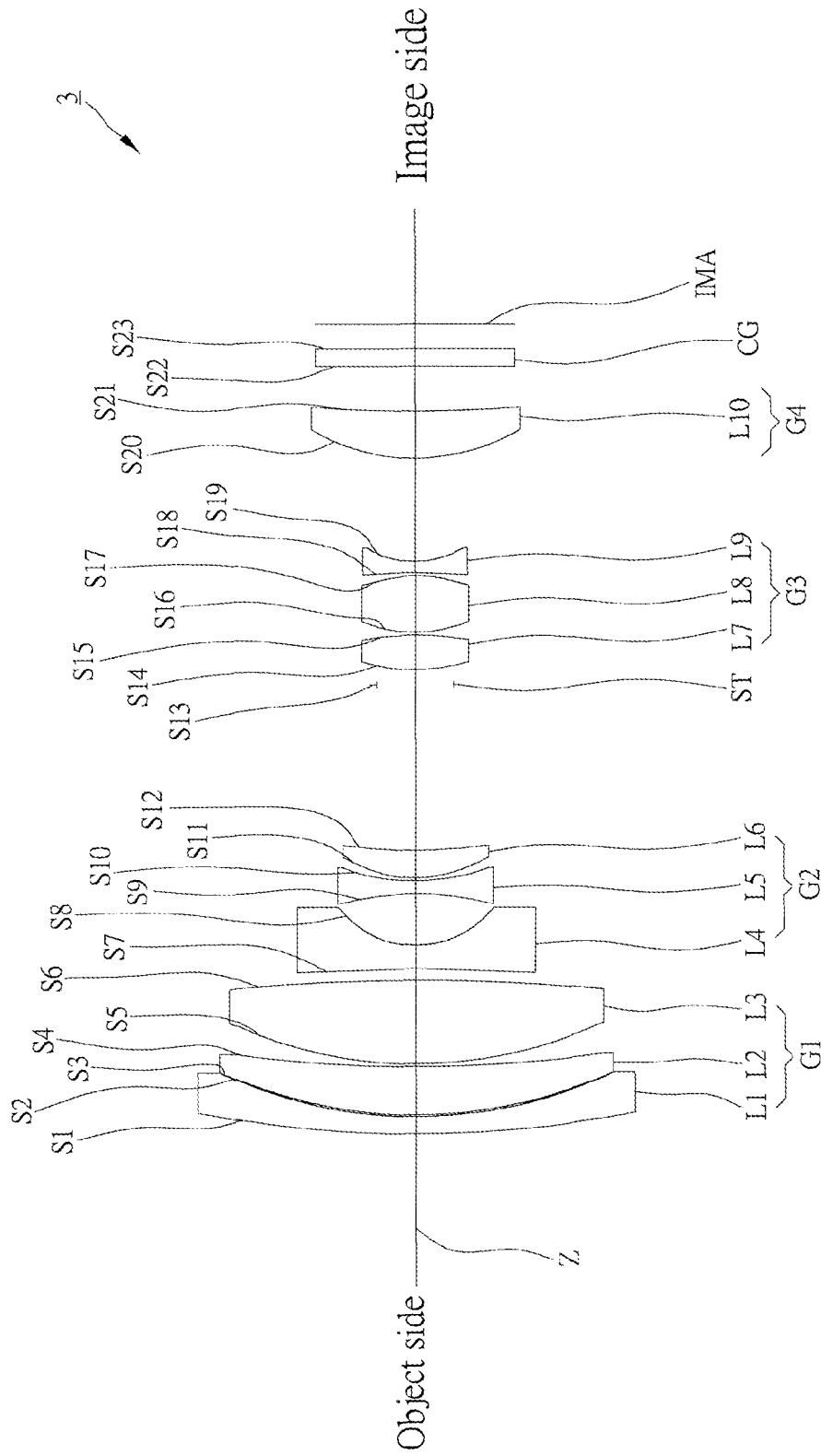
FIG. 13 is a sketch diagram of the arrangement of the lenses of a third preferred embodiment of the present invention in the wide-angle mode.
Figure 14:
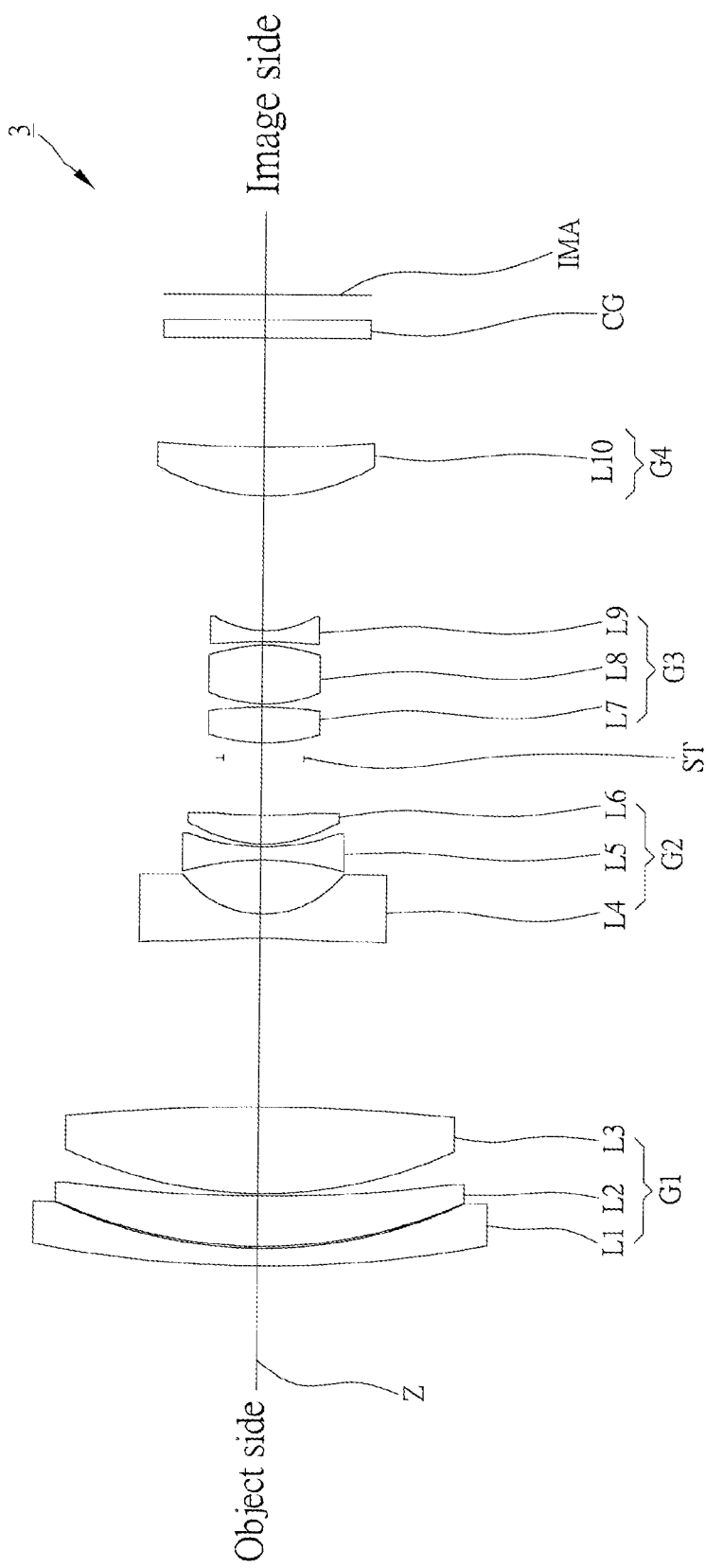
FIG. 14 is a sketch diagram of the arrangement of the lenses of the third preferred embodiment of the present invention in the middle mode.
Figure 15:
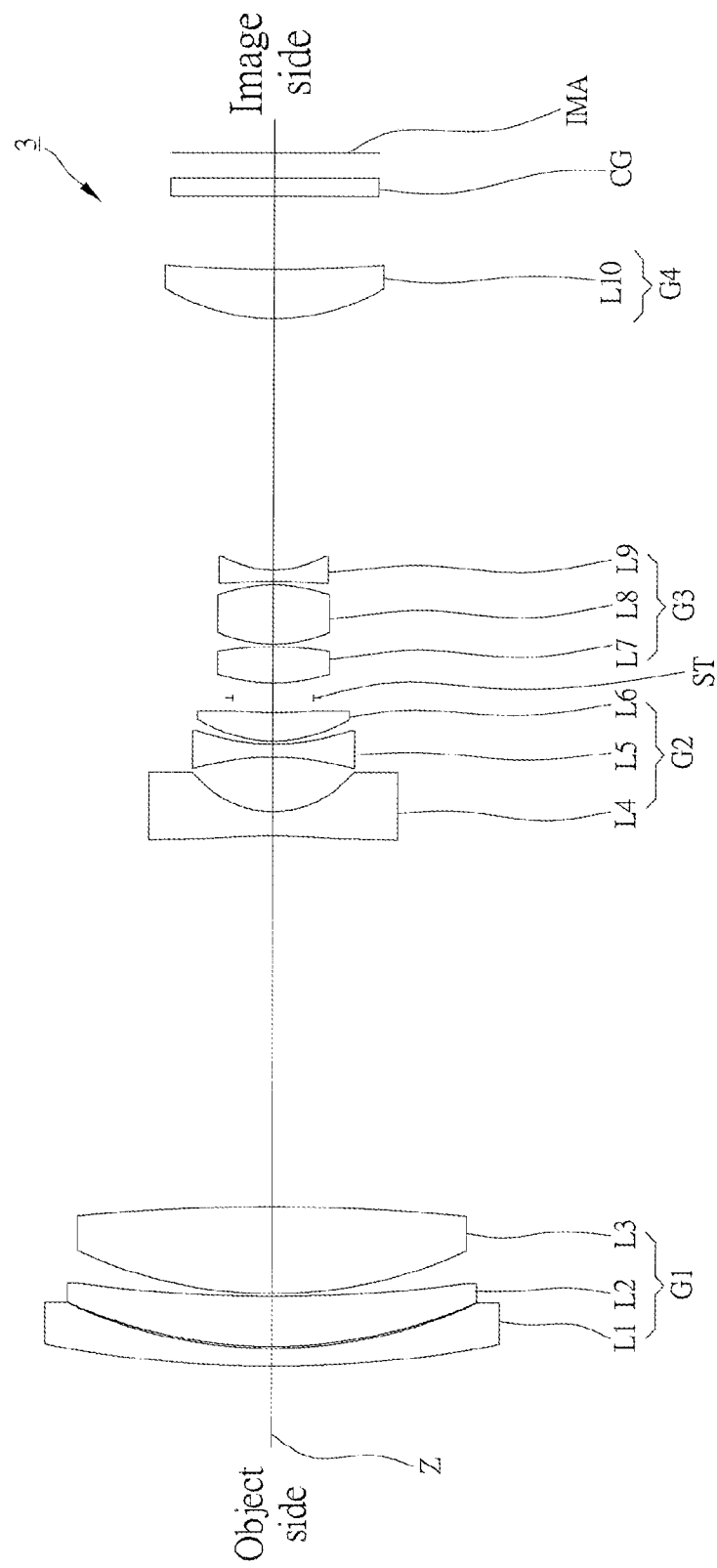
FIG. 15 is a sketch diagram of the arrangement of the lenses of the third preferred embodiment of the present invention in the telephoto mode.

As shown in FIG. 13 to FIG. 15, a zoom lens 3 of the third preferred embodiment of the present invention includes, along an optical axis Z from an object side to an image side, a first lens group G1, a second lens group G2, an aperture ST, a third lens group G3, a fourth lens group G4, and an image surface IMA. The zoom lens 1 may be switched to a wide-angle mode (FIG. 13), a middle mode (FIG. 14), and a telephoto mode (FIG. 15) by moving the first lens group G1, the second lens group G2, and the third lens group G3. It may be further provided with a cover glass CG, which is a flat glass in the present embodiment, between the fourth lens group G4 and the image surface IMA.

The first lens group G1 has positive refractive power and includes a first lens L1, a second lens L2, and a third lens L3 in sequence from the object side to the image side. The first lens L1 is a meniscus lens with negative refractive power, and its convex surface S1 faces the object side. The second lens L2 is a meniscus lens with positive refractive power, and its convex surface S3 faces the object side. The third lens L3 is a biconvex lens with positive refractive power.

The second lens group G2 has negative refractive power, and includes a fourth lens L4, a fifth lens L5, and a sixth lens L6 in sequence from the object side to the image side. The fourth lens L4 is a biconcave lens with negative refractive power, and both of its concave surfaces S7 and S8 are aspheric surfaces. The fifth lens L5 is a biconcave lens with negative refractive power, and both of its concave surfaces S9 and S10 are aspheric surfaces. The sixth lens L6 is a meniscus lens with positive refractive power, and its convex surface S11 is an aspheric surface and faces the object side.

The third lens group G3 has positive refractive power, and includes a seventh lens L7, an eighth lens L8 and a ninth lens L9 in sequence from the object side to the image side. The seventh lens L7 is a biconvex lens with positive refractive power. The eighth lens L8 is a biconvex lens with positive refractive power, and its convex surface S17 facing the object side is an aspheric surface. The ninth lens L9 is a biconcave lens with negative refractive power, and both of its concave surfaces S18 and S19 are aspheric surfaces.

The fourth lens group G4 has positive refractive power and includes a tenth lens L10. The tenth lens L10 is a meniscus lens with positive refractive power, and its convex surface S20 is an aspheric surface and faces the object side.

As shown in FIG. 13 and FIG. 14, the zoom lens 3 is switched to the middle mode from the wide-angle mode by moving the first lens group G1 toward the object side, moving the second lens group G2 toward the image side, and moving the third lens group G3 toward the object side. As shown in FIG. 14 and FIG. 15, the zoom lens 3 is switched to the telephoto mode from the middle mode by moving the first lens group G1 toward the object side, moving the second lens group G2 toward the object side, and moving the third lens group G3 toward the object side. As shown in FIG. 13 and FIG. 15, the zoom lens 3 is switched to the telephoto mode from the wide-angle mode by moving the first lens group G1 toward the object side, moving the second lens group G2 toward the image side, and moving the third lens group G3 toward the object side. In addition, the fourth lens group G4 is moved toward the object side when the zoom lens 3 is focusing.

In order to obtain a good optical performance, the zoom lens 3 of the present invention has the following features:

$$0.35 \leq (MG1 \cdot fW)/(fT \cdot Y) \leq 0.9 \quad (1)$$

$$0 < |(MG2 \cdot Y)/fG2| \leq 1.0 \quad (2)$$

$$1.3 \leq (fG2 \cdot MG3)/fG1 \leq 1.8 \quad (3)$$

$$1.00 \leq |fG3/fG2| \leq 1.45 \quad (4)$$

wherein

MG1 is the distance of movement of the first lens group G1 when the zoom lens 1 is switched to the telephoto mode from the wide-angle mode;

MG2 is the distance of movement of the second lens group G2 when the zoom lens 1 is switched to the telephoto mode from the wide-angle mode;

MG3 is the distance of movement of the third lens group G3 when the zoom lens 1 is switched to the telephoto mode from the wide-angle mode;

fW is the focus length of the zoom lens 1 in wide-angle mode;

fT is the focus length of the zoom lens 1 in telephoto mode;

fG1 is the focus length of the first lens group G1;

fG2 is the focus length of the second lens group G2;

fG3 is the focus length of the third lens group G3; and

Y is a half of the maximum diagonal of the image surface IMA.

The focus length (F), the half of the maximum diagonal of the image surface IMA (Y), the radius of curvature at the optical axis of each lens (R), the thickness at the optical axis of each lens (T), the refractive index (Nd), and the Abbe number (Vd) of the zoom lens 32 of the present invention is shown in Table 5.

TABLE 5

F = 5.23(W)~11.4(M)~24.6(T) Y = 4.0 mm

| Surface | R (mm) | T (mm) | Nd | Vd | note |
|---|---|---|---|---|---|
| S1 | 47.145 | 0.700 | 1.761821 | 26.5 | L1 |
| S2 | 18.953 | 0.070 | | | |
| S3 | 18.926 | 1.997 | 1.518229 | 58.9 | L2 |
| S4 | 56.824 | 0.110 | | | |
| S5 | 18.247 | 3.437 | 1.534611 | 56.1 | L3 |
| S6 | −79.009 | 0.4800(W)~6.6962(M)~14.6952(T) | | | |
| S7 | −18.171 | 0.960 | 1.534611 | 56.1 | L4 |
| S8 | 4.191 | 2.138 | | | |
| S9 | −12.820 | 0.527 | 1.534611 | 56.1 | L5 |
| S10 | 8.267 | 0.110 | | | |
| S11 | 4.930 | 1.135 | 1.614220 | 25.6 | L6 |
| S12 | 20.050 | 6.8329(W)~2.2727(M)~0.5754(T) | | | |
| S13 | | 0.6 | | | ST |
| S14 | 6.584 | 1.432 | 1.525279 | 56.0 | L7 |
| S15 | −13.429 | 0.120 | | | |
| S16 | 5.649 | 2.333 | 1.525279 | 56.0 | L8 |
| S17 | −4.985 | 0.130 | | | |
| S18 | −25.480 | 0.449 | 1.805181 | 25.4 | L9 |
| S19 | 3.641 | 4.2608(W)~5.3375(M)~9.9607(T) | | | |
| S20 | 8.279 | 1.939 | 1.534611 | 56.1 | L10 |
| S21 | 53.216 | 1.8538(W)~4.3330(M)~2.8995(T) | | | |
| S22 | INF | 0.720 | 1.516330 | 64.1 | CG |
| S23 | INF | 1.000 | | | |

In the column T of Table 5, W indicates the distance between two neighboring surfaces in the optical axis in the wide-angle mode; M indicates the distance between two neighboring surfaces in the optical axis in the middle mode; T indicates the distance between two neighboring surfaces in the optical axis in the telephoto mode.

The depression z of the aspheric surfaces S7, S8, S9, S10, S11, S17, S18, S19, and S20 may be obtained by the following equation:

$$z = \frac{ch^2}{1 + [1-(k+1)c^2h^2]^{\frac{1}{2}}} + Ah^4 + Bh^6 + Ch^8 + Dh^{10} + Eh^{12} + Fh^{14} + Gh^{16}$$

wherein
z is the depression of the aspheric surface;
c is the reciprocal of radius of curvature;
h is the radius of aperture on the surface;
k is conic constant;
A~G are coefficients of the radius of aperture h.

The conic constants of the aspheric surfaces and the coefficients A~G are shown in Table 6.

TABLE 6

| | K | A | B | C | D | E | F | G |
|---|---|---|---|---|---|---|---|---|
| S7 | −129.30205 | 5.90455E−04 | 1.63194E−05 | −2.59911E−06 | 4.50467E−08 | 1.72379E−09 | −5.82638E−11 | 2.60758E−13 |
| S8 | −0.08676 | 1.53979E−03 | −8.38751E−05 | 2.54201E−05 | −2.08647E−06 | 2.24302E−07 | −3.86878E−08 | 1.62115E−09 |
| S9 | 0 | −3.66015E−03 | 9.30033E−04 | −1.24367E−04 | 9.16587E−06 | −6.82669E−08 | −4.24375E−08 | 2.24590E−09 |
| S10 | 0 | −4.11294E−03 | 1.23127E−03 | −1.63544E−04 | 6.81899E−06 | 8.86645E−07 | −1.05823E−07 | 2.67563E−09 |
| S11 | 0 | −2.64048E−03 | 2.95469E−04 | −2.23827E−05 | −5.47806E−06 | 1.33904E−06 | −1.08293E−07 | 2.61746E−09 |
| S17 | 0 | 5.09728E−03 | 1.13401E−03 | −6.58444E−04 | 1.26768E−04 | −7.42297E−06 | 0 | 0 |
| S18 | 0 | −6.88682E−03 | 5.14976E−03 | −1.79903E−03 | 3.04178E−04 | −1.79544E−05 | 0 | 0 |
| S19 | 0 | −8.72103E−03 | 4.56430E−03 | −1.37656E−03 | 2.02532E−05 | −1.04316E−05 | 0 | 0 |
| S20 | 0.25106 | −3.09046E−04 | 4.36447E−05 | −4.14642E−06 | 1.80489E−07 | −3.15361E−09 | 0 | 0 |

The lenses and the apertures ST as described above may reduce the size of the zoom lens 3 of the present invention. The zoom lens 3 still has a good optical performance in the wide-angle mode as shown in FIG. 16A to FIG. 16D.

Figure 16A:
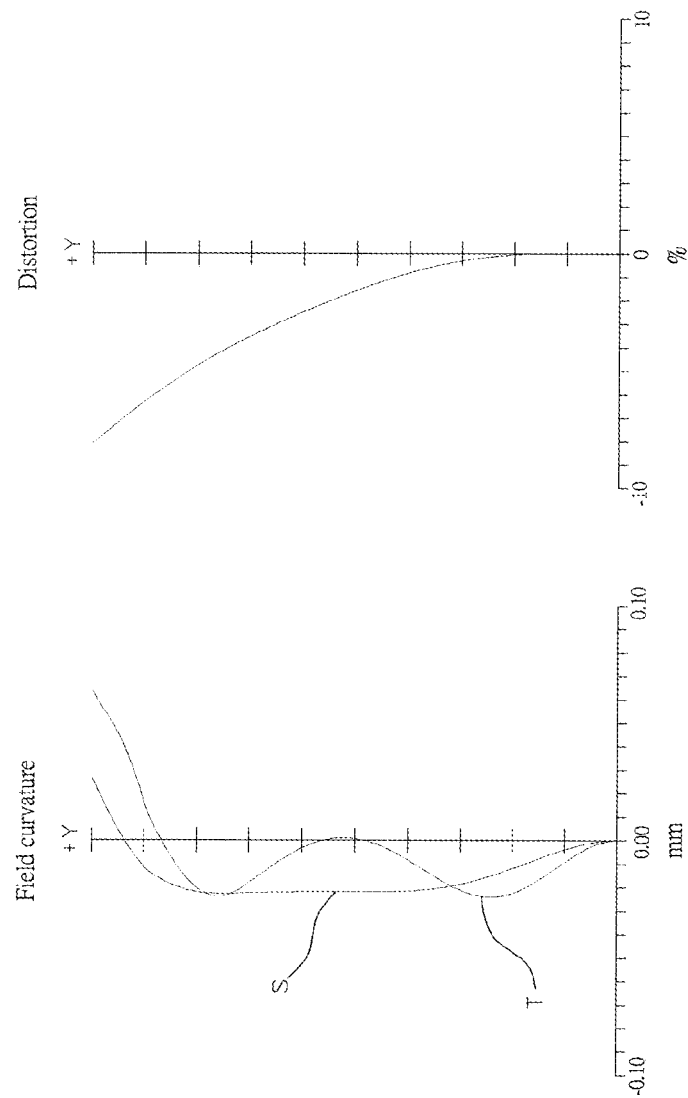
FIG. 16A is a field curvature diagram and a distortion diagram of the third preferred embodiment of the present invention in the wide-angle mode.
Figure 16D:
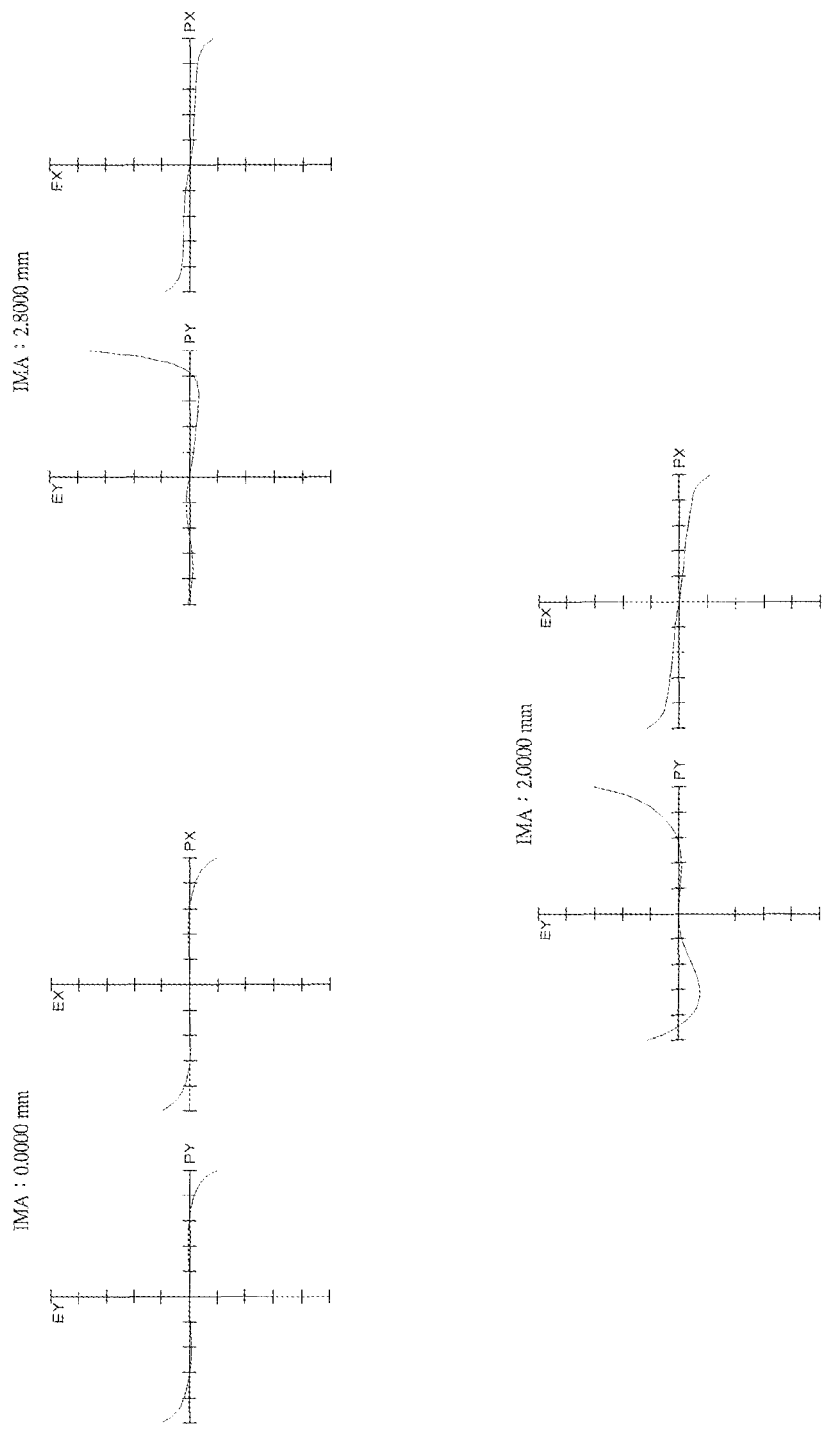
FIG. 16D is a coma aberration diagram of the third preferred embodiment of the present invention in the wide-angle mode.

In FIG. 16A, it shows that the maximum field curvature is about 0.07 mm and −0.03 mm, and the maximum distortion is about −8%. In FIG. 16B, it shows that the maximum transverse chromatic aberration is about −4 μm. FIG. 16C shows that the maximum spherical aberration is about 0.02 mm and −0.05 mm. FIG. 16D shows that all the coma aberrations of the zoom lens 3 are acceptable.

Figure 17A:
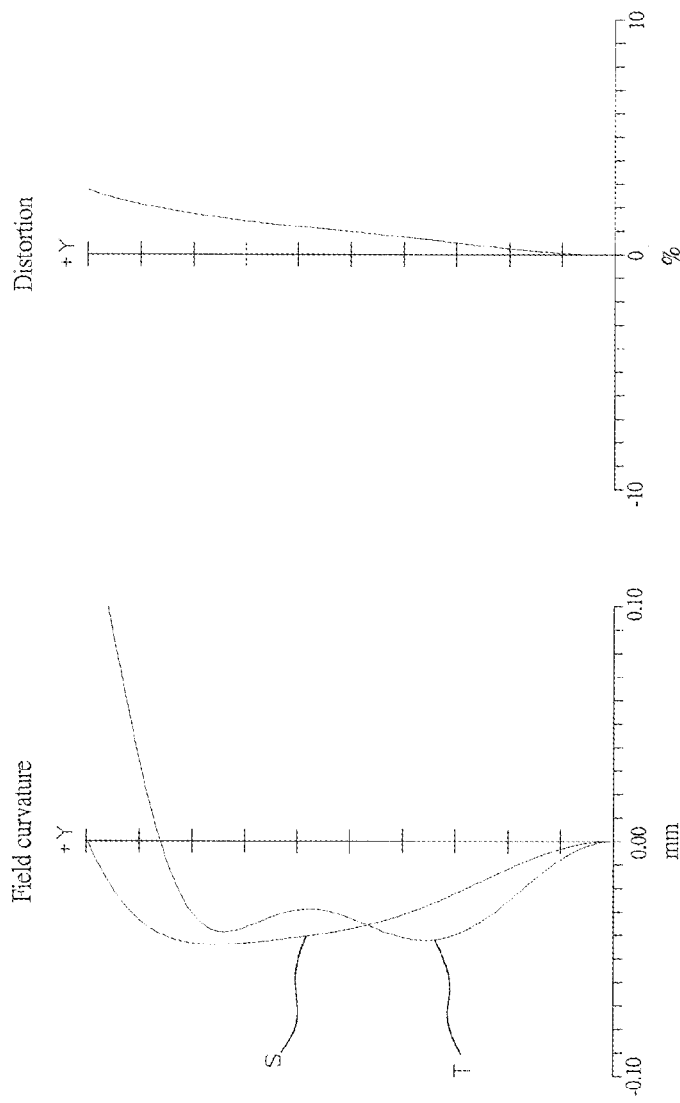
FIG. 17A is a field curvature diagram and a distortion diagram of the third preferred embodiment of the present invention in the middle mode.
Figure 17D:
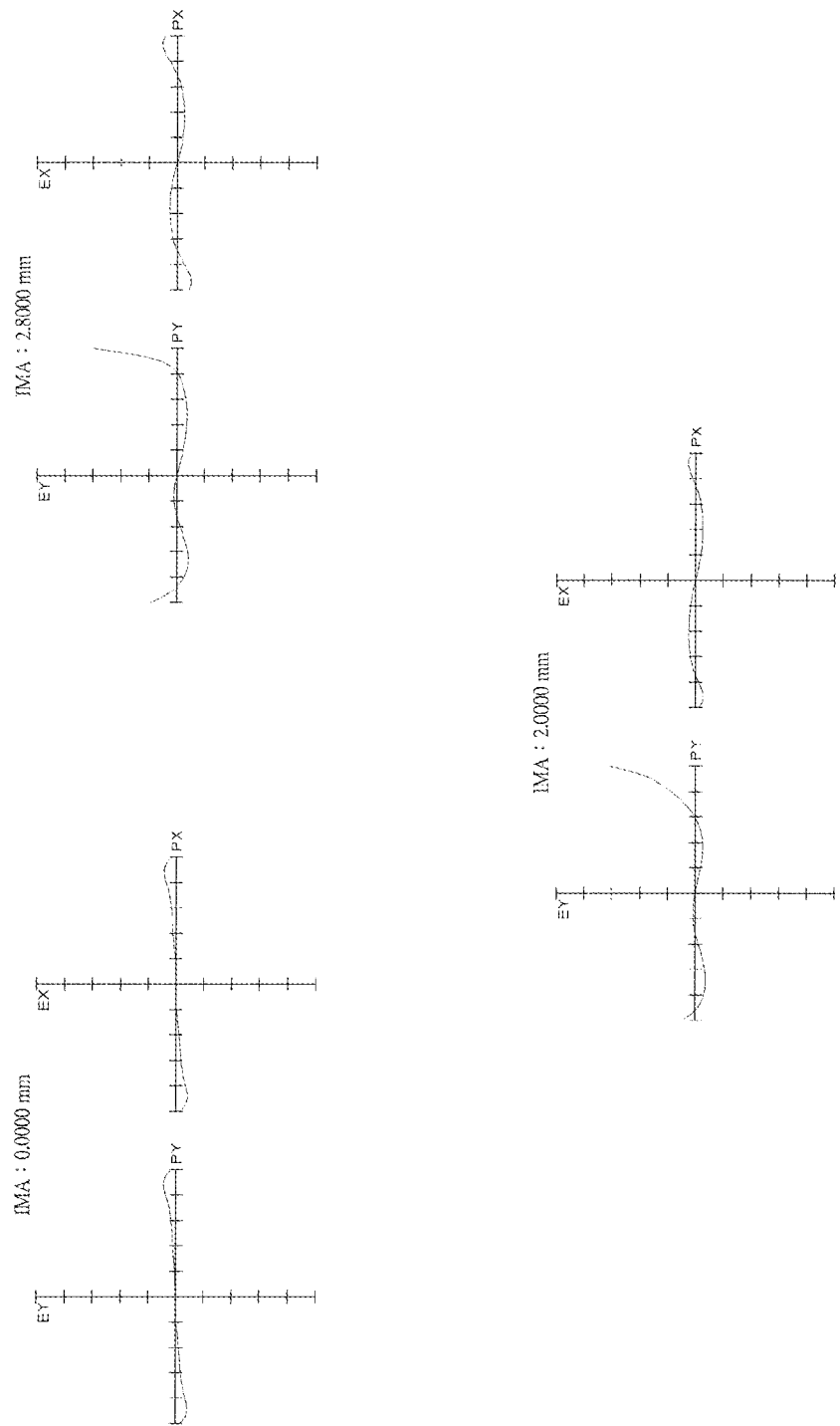
FIG. 17D is a coma aberration diagram of the third preferred embodiment of the present invention in the middle mode.

In the middle mode, the zoom lens 3 of the present invention has a good optical performance also. FIG. 17A shows the maximum field curvature is about 0.10 mm and −0.05 mm, and the maximum distortion is about 3%. In FIG. 17B, it shows that the maximum transverse chromatic aberration is about −4 μm. FIG. 17C shows that the maximum spherical aberration is about 0.045 mm and −0.015 mm. FIG. 17D shows that all the coma aberrations of the zoom lens 3 are acceptable.

Figure 18A:
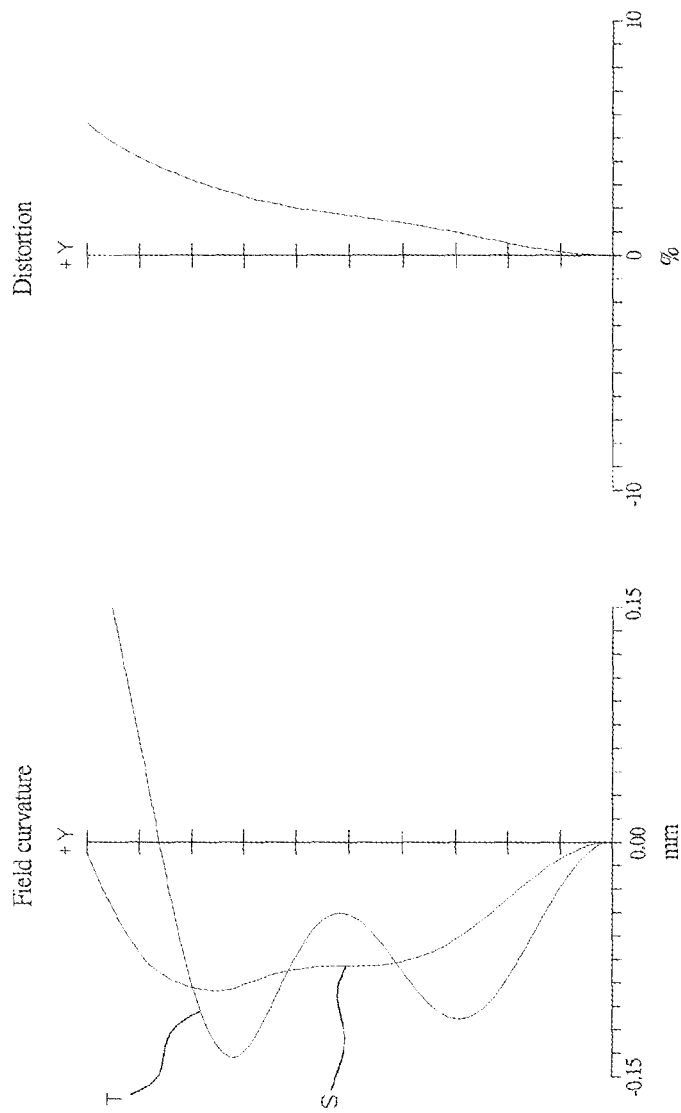
FIG. 18A is a field curvature diagram and a distortion diagram of the third preferred embodiment of the present invention in the telephoto mode.
Figures 18B, 18C:
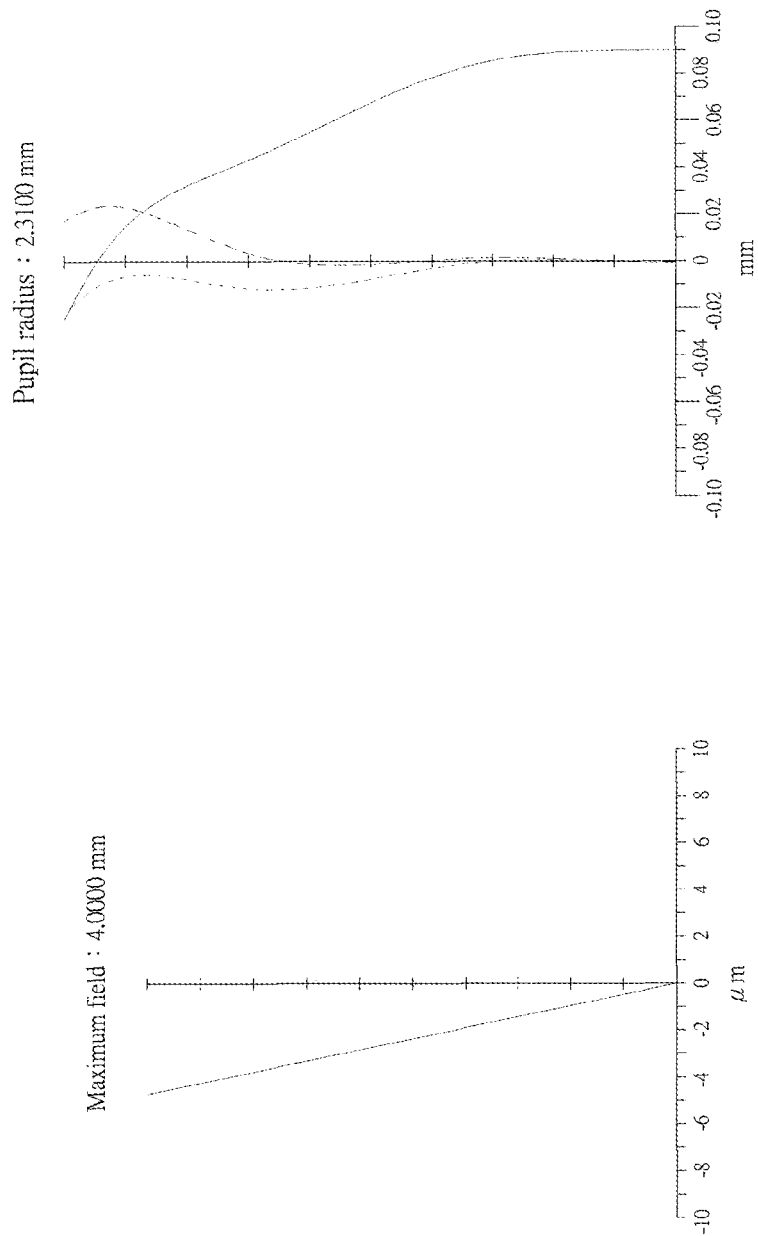
FIG. 18B is a transverse chromatic aberration diagram of the third preferred embodiment of the present invention in the telephoto mode.
FIG. 18C is a spherical aberration diagram of the third preferred embodiment of the present invention in the telephoto mode.
Figure 18D:
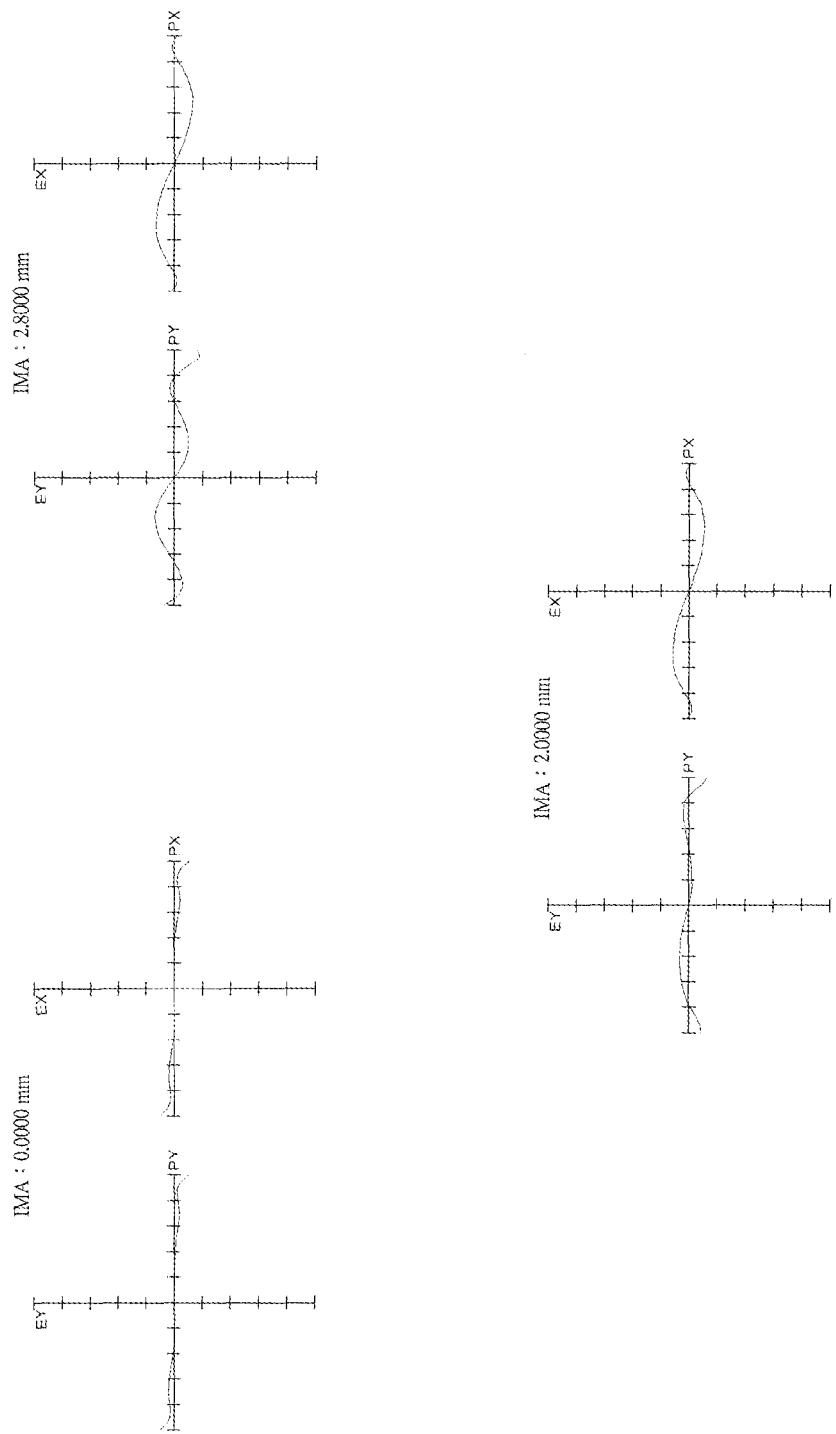
FIG. 18D is a coma aberration diagram of the third preferred embodiment of the present invention in the telephoto mode.

In the telephoto mode, FIG. 18A shows the maximum field curvature is about 0.15 mm and −0.15 mm, and the maximum distortion is about 6%. In FIG. 18B, it shows that the maximum transverse chromatic aberration is about −5 μm. FIG. 18C shows that the maximum spherical aberration is about 0.09 mm and −0.03 mm. FIG. 18D shows that all the coma aberrations of the zoom lens 3 are acceptable.

Fourth Preferred Embodiment

Figure 19:
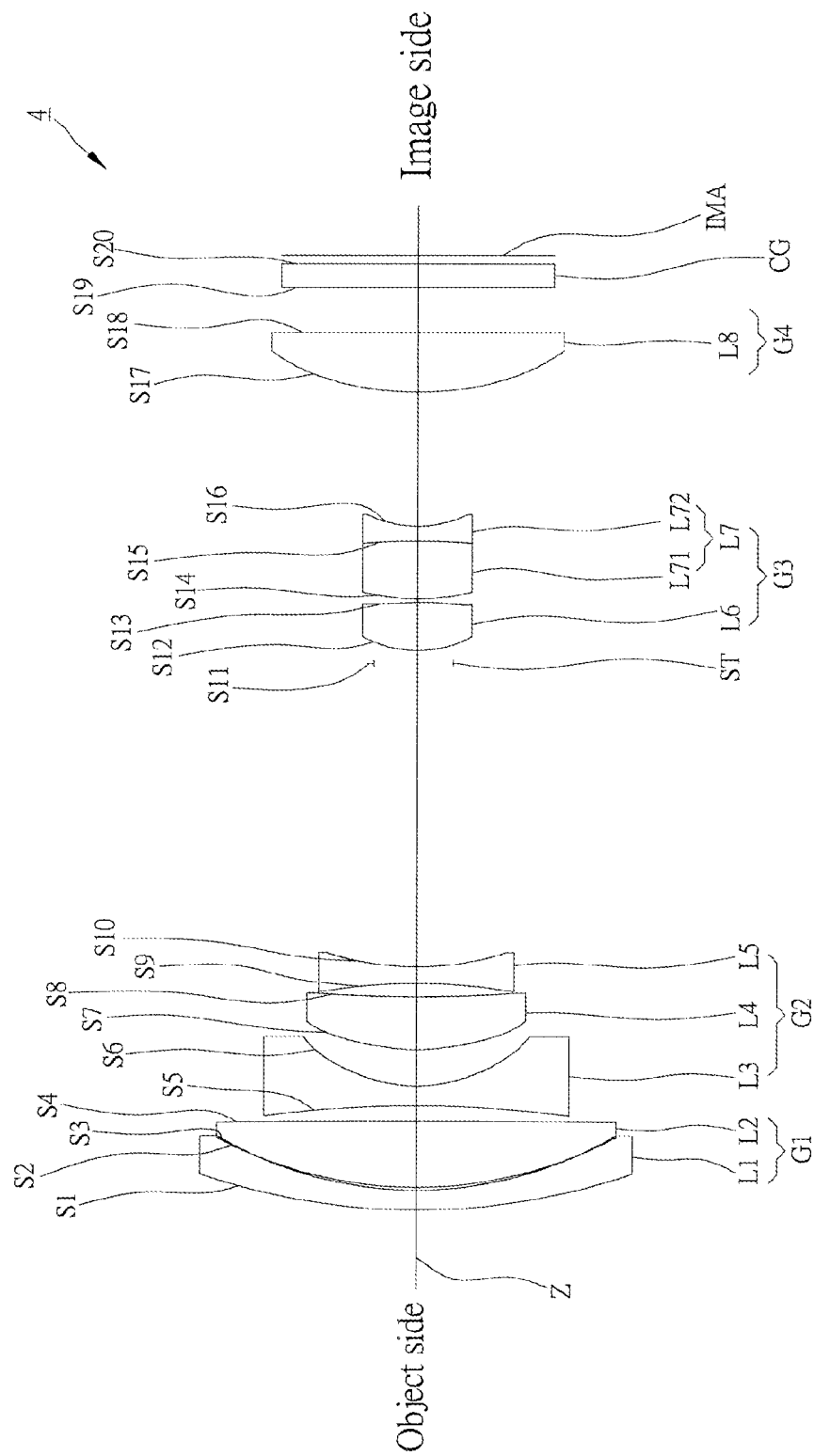
FIG. 19 is a sketch diagram of the arrangement of the lenses of a fourth preferred embodiment of the present invention in the wide-angle mode.
Figure 20:
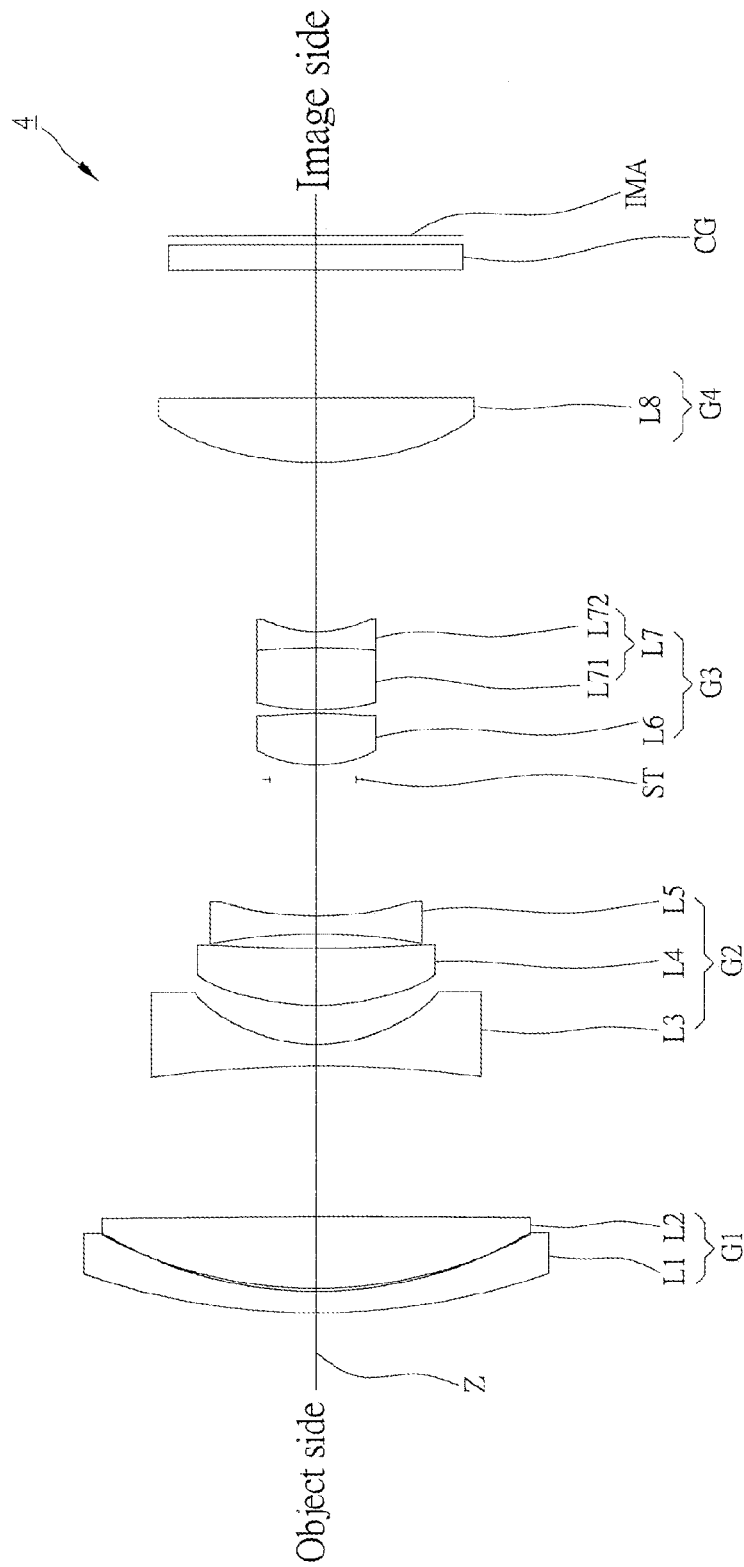
FIG. 20 is a sketch diagram of the arrangement of the lenses of the fourth preferred embodiment of the present invention in the middle mode.
Figure 21:
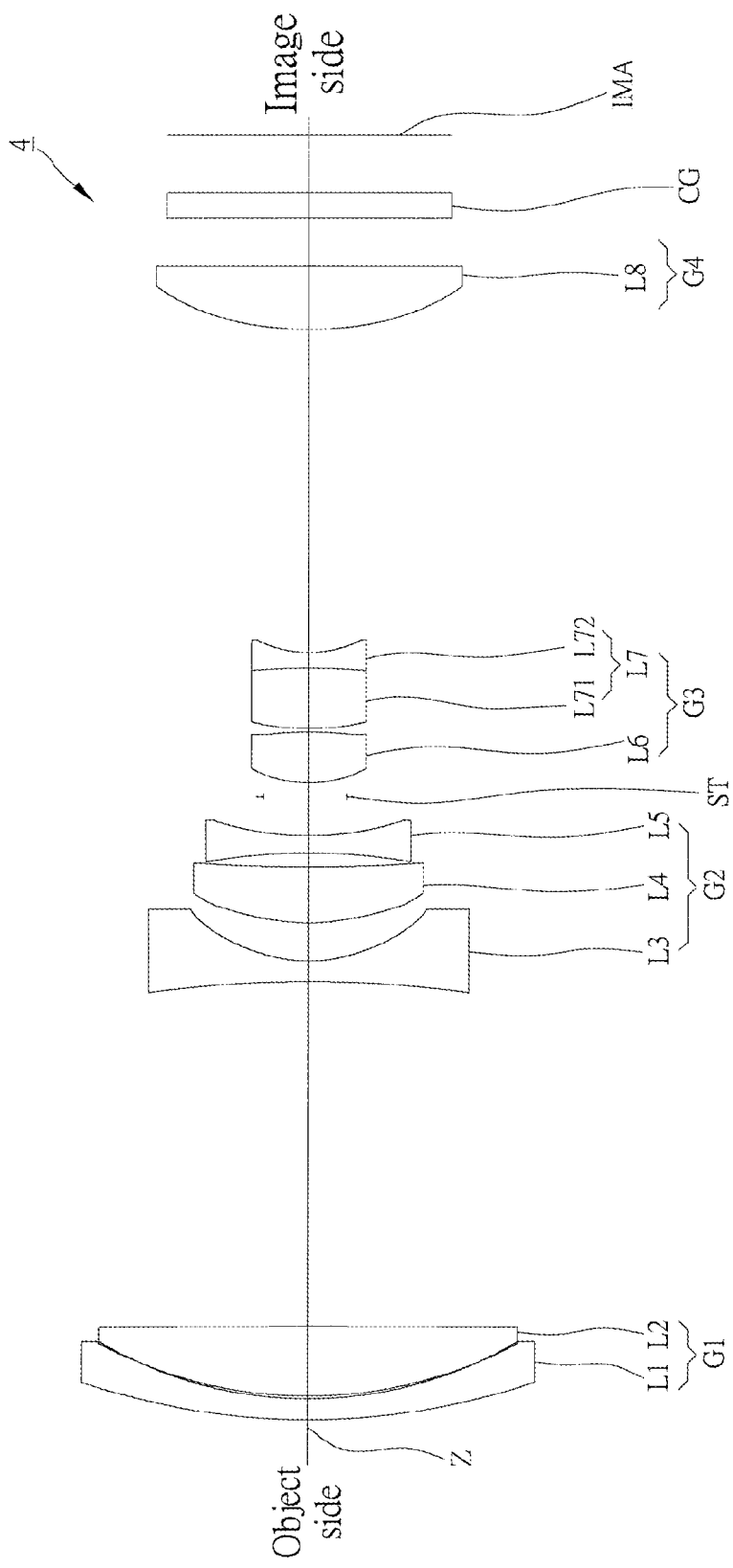
FIG. 21 is a sketch diagram of the arrangement of the lenses of the fourth preferred embodiment of the present invention in the telephoto mode.

As shown in FIG. 19 to FIG. 21, a zoom lens 4 of the fourth preferred embodiment of the present invention includes, along an optical axis Z from an object side to an image side, a first lens group G1, a second lens group G2, an aperture ST, a third lens group G3, a fourth lens group G4, and an image surface IMA. The zoom lens 1 may be switched to a wide-angle mode (FIG. 19), a middle mode (FIG. 20), and a telephoto mode (FIG. 21) by moving the first lens group G1, the second lens group G2, and the third lens group G3. It may be further provided with a cover glass CG, which is a flat glass in the present embodiment, between the fourth lens group G4 and the image surface IMA.

The first lens group G1 has positive refractive power and includes a first lens L1 and a second lens L2 in sequence from the object side to the image side. The first lens L1 is a meniscus lens with negative refractive power, and its convex surface S1 faces the object side. The second lens L2 is a biconvex lens with positive refractive power. In practice, the second lens L2 may be a meniscus lens or a plano-convex lens with positive refractive power to serve the same function.

The second lens group G2 has negative refractive power, and includes a third lens L3 a fourth lens L4, and a fifth lens L5 in sequence from the object side to the image side. The third lens L3 is a biconcave lens with negative refractive power, and its concave surface S6 facing the image side is an aspheric surface. The fourth lens L4 is a meniscus lens with positive refractive power, and its convex surfaces S7 is an aspheric surface and faces the object side. The fifth lens L5 is a biconcave lens with negative refractive power, and its concave surface S10 facing the image side is an aspheric surface. In practice, the third lens L3 may be a biconvex lens with positive refractive power to serve the same function.

The third lens group G3 has positive refractive power, and includes a sixth lens L6 and a seventh lens L7 in sequence from the object side to the image side. The sixth lens L6 is a biconvex lens with positive refractive power, and both of its convex surfaces S12 and S13 are aspheric surfaces. The seventh lens L7 is a doublet with negative refractive power. The doublet includes a biconvex lens L71 and a biconcave lens L72, and the biconvex lens L71 is proximal to the object side.

The fourth lens group G4 has positive refractive power and includes an eighth lens L8. The eighth lens L8 is a plano-convex lens with positive refractive power, and its convex surface S17 is an aspheric surface and faces the object side.

As shown in FIG. 19 and FIG. 20, the zoom lens 4 is switched to the middle mode from the wide-angle mode by moving the first lens group G1 toward the object side, moving the second lens group G2 toward the image side, and moving the third lens group G3 toward the object side. As shown in FIG. 20 and FIG. 21, the zoom lens 4 is switched to the telephoto mode from the middle mode by moving the first lens group G1 toward the object side, moving the second lens group G2 toward the object side, and moving the third lens group G3 toward the object side. As shown in FIG. 19 and FIG. 21, the zoom lens 4 is switched to the telephoto mode from the wide-angle mode by moving the first lens group G1 toward the object side, moving the second lens group G2 toward the image side, and moving the third lens group G3 toward the object side. In addition, the fourth lens group G4 is moved toward the object side when the zoom lens 4 is focusing.

In order to obtain a good optical performance, the zoom lens 4 of the present invention has the following features:

$$0.35 \leq (MG1 \cdot fW)/(fT \cdot Y) \leq 0.9 \quad (1)$$

$$0 < |(MG2 \cdot Y)/fG2| \leq 1.0 \quad (2)$$

$$1.3 \leq (fG2 \cdot MG3)/fG1 \leq 1.8 \quad (3)$$

$$1.00 \leq |fG3/fG2| \leq 1.45 \quad (4)$$

wherein

MG1 is the distance of movement of the first lens group G1 when the zoom lens 1 is switched to the telephoto mode from the wide-angle mode;

MG2 is the distance of movement of the second lens group G2 when the zoom lens 1 is switched to the telephoto mode from the wide-angle mode;

MG3 is the distance of movement of the third lens group G3 when the zoom lens 1 is switched to the telephoto mode from the wide-angle mode;

fW is the focus length of the zoom lens 1 in wide-angle mode;

fT is the focus length of the zoom lens 1 in telephoto mode;

fG1 is the focus length of the first lens group G1;

fG2 is the focus length of the second lens group G2;

fG3 is the focus length of the third lens group G3; and

Y is a half of the maximum diagonal of the image surface IMA.

The focus length (F), the half of the maximum diagonal of the image surface IMA (Y), the radius of curvature at the optical axis of each lens (R), the thickness at the optical axis of each lens (T), the refractive index (Nd), and the Abbe number (Vd) of the zoom lens 4 of the present invention is shown in Table 7.

TABLE 7

| F = 5.21(W)~11.0(M)~24.8(T) Y = 4.0 mm | | | | | |
|---|---|---|---|---|---|
| Surface | R (mm) | T (mm) | Nd | Vd | note |
| S1 | 20.015 | 0.600 | 1.746660 | 23.8 | L1 |
| S2 | 11.790 | 0.100 | | | |
| S3 | 12.695 | 2.000 | 1.759157 | 54.7 | L2 |
| S4 | −550.334 | 0.4600(W)~4.2330(M)~9.8930(T) | | | |
| S5 | −35.199 | 0.600 | 1.534611 | 56.1 | L3 |
| S6 | 4.129 | 1.100 | | | |
| S7 | 5.892 | 1.600 | 1.614220 | 25.6 | L4 |
| S8 | 44.829 | 0.400 | | | |
| S9 | −16.982 | 0.500 | 1.534611 | 56.1 | L5 |
| S10 | 7.824 | 9.1671(W)~3.8380(M)~1.1199(T) | | | |
| S11 | | 0.400 | | | ST |
| S12 | 3.736 | 1.450 | 1.534611 | 56.1 | L6 |
| S13 | −9.904 | 0.100 | | | |
| S14 | 7.029 | 1.743 | 1.910822 | 37.3 | L7 |
| S15 | −20.555 | 0.450 | 2.000694 | 26.3 | |
| S16 | 3.420 | 4.0441(W)~4.7430(M)~9.2671(T) | | | |

TABLE 7-continued

| F = 5.21(W)~11.0(M)~24.8(T) Y = 4.0 mm | | | | | |
|---|---|---|---|---|---|
| Surface | R (mm) | T (mm) | Nd | Vd | note |
| S17 | 9.941 | 1.800 | 1.534611 | 56.1 | L8 |
| S18 | INF | 0.6154(W)~2.8314(M)~2.0520(T) | | | |
| S19 | INF | 0.720 | 1.516330 | 64.1 | CG |
| S20 | INF | 1.000 | | | |

In the column T of Table 7, W indicates the distance between two neighboring surfaces in the optical axis in the wide-angle mode; M indicates the distance between two neighboring surfaces in the optical axis in the middle mode; T indicates the distance between two neighboring surfaces in the optical axis in the telephoto mode.

The depression z of the aspheric surfaces S6, S7, S10, S12, S13, and S17 may be obtained by the following equation:

$$z = \frac{ch^2}{1 + [1-(k+1)c^2h^2]^{\frac{1}{2}}} + Ah^4 + Bh^6 + Ch^8 + Dh^{10} + Eh^{12} + Fh^{14} + Gh^{16}$$

wherein z is the depression of the aspheric surface;

c is the reciprocal of radius of curvature;

h is the radius of aperture on the surface;

k is conic constant;

A~G are coefficients of the radius of aperture h.

The conic constants of the aspheric surfaces and the coefficients A~G are shown in Table 8.

TABLE 8

| | K | A | B | C | D | E | F | G |
|---|---|---|---|---|---|---|---|---|
| S6 | −8.34180E−01 | −4.51903E−03 | 8.47092E−04 | −8.49240E−05 | 4.14159E−06 | 0 | 0 | 0 |
| S7 | 1.45296E−01 | −7.00322E−03 | 9.79368E−04 | −8.18814E−05 | 3.58781E−06 | 0 | 0 | 0 |
| S10 | 0 | −6.78781E−03 | 1.94048E−03 | −2.57686E−04 | 1.39933E−05 | 0 | 0 | 0 |
| S12 | 0 | 4.09615E−04 | 1.16564E−03 | −2.08044E−04 | 1.64976E−04 | −2.09357E−05 | 0 | 0 |
| S13 | 0 | 5.06560E−03 | 7.14096E−04 | 2.15196E−04 | 6.54071E−05 | 0 | 0 | 0 |
| S17 | 0 | 1.21988E−04 | 3.06003E−05 | −2.96913E−07 | −1.04077E−09 | 0 | 0 | 0 |

The lenses and the apertures ST as described above may reduce the size of the zoom lens 4 of the present invention. The zoom lens 4 still has a good optical performance in the wide-angle mode as shown in FIG. 22A to FIG. 22D.

Figure 22A:
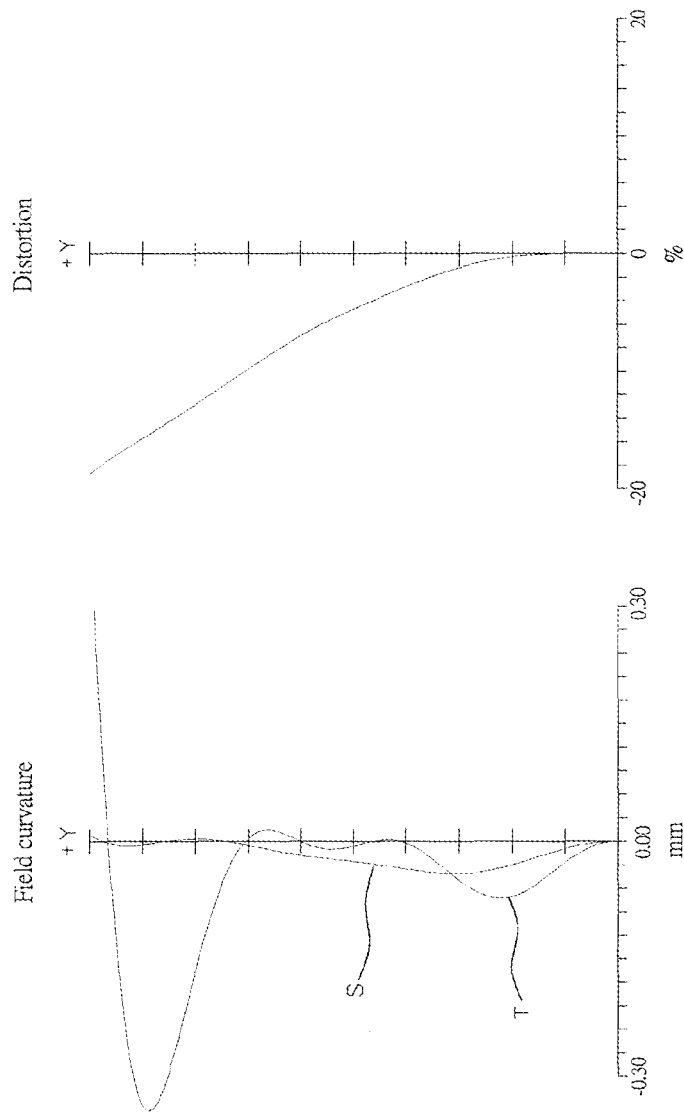
FIG. 22A is a field curvature diagram and a distortion diagram of the fourth preferred embodiment of the present invention in the wide-angle mode.
Figure 22D:
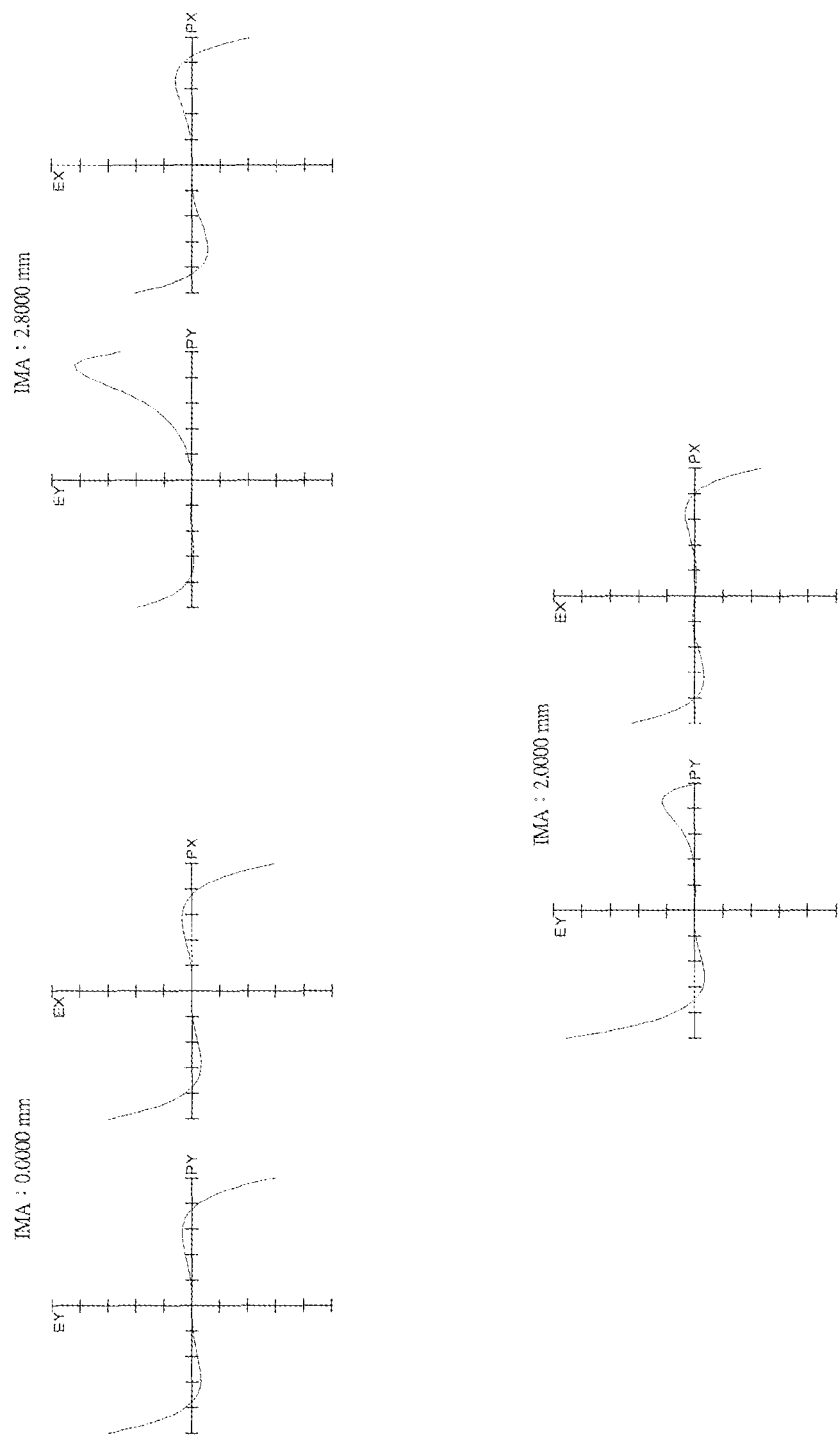
FIG. 22D is a coma aberration diagram of the fourth preferred embodiment of the present invention in the wide-angle mode.

In FIG. 22A, it shows that the maximum field curvature is about 0.30 mm and −0.30 mm, and the maximum distortion is about −18%. In FIG. 22B, it shows that the maximum transverse chromatic aberration is about −8 μm. FIG. 22C shows that the maximum spherical aberration is about 0.05 mm and −0.2 mm. FIG. 22D shows that all the coma aberrations of the zoom lens 4 are acceptable.

Figure 23A:
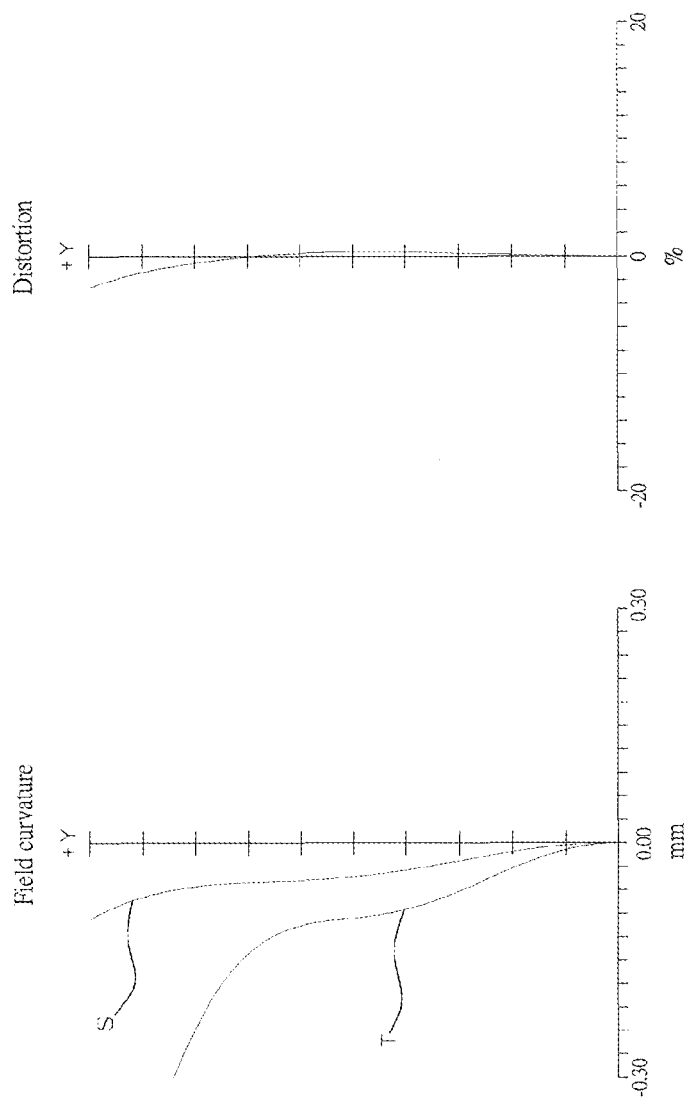
FIG. 23A is a field curvature diagram and a distortion diagram of the fourth preferred embodiment of the present invention in the middle mode.
Figure 23:
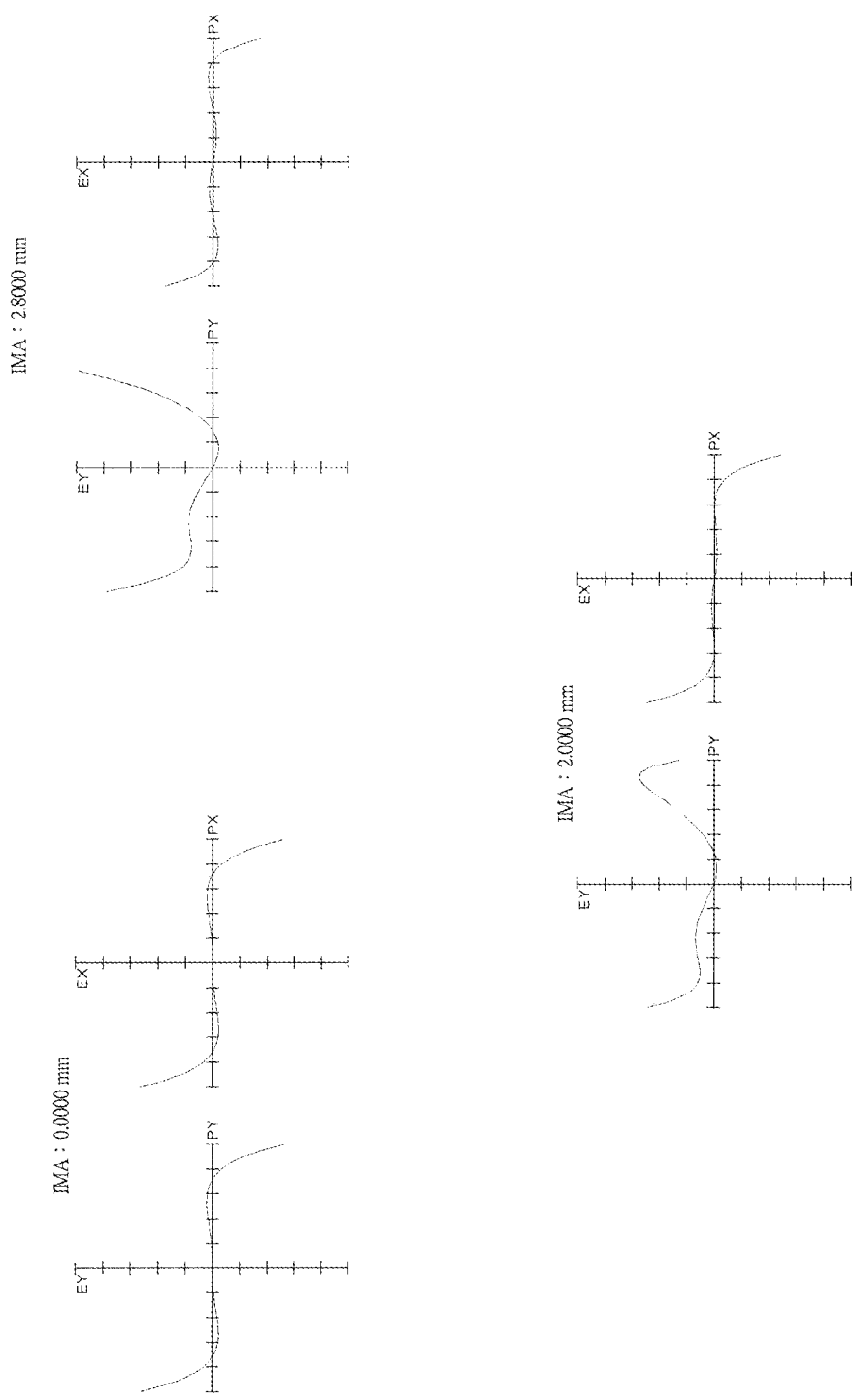
FIG. 23B is a transverse chromatic aberration diagram of the fourth preferred embodiment of the present invention in the middle mode.
FIG. 23C is a spherical aberration diagram of the fourth preferred embodiment of the present invention in the middle mode.
FIG. 23D is a coma aberration diagram of the fourth preferred embodiment of the present invention in the middle mode.

In the middle mode, the zoom lens 4 of the present invention has a good optical performance also. FIG. 23A shows the maximum field curvature is about 0.03 mm and −0.3 mm, and the maximum distortion is about 4%. In FIG. 23B, it shows that the maximum transverse chromatic aberration is about −12 μm. FIG. 23C shows that the maximum spherical aberration is about 0.05 mm and −0.2 mm. FIG. 23D shows that all the coma aberrations of the zoom lens 4 are acceptable.

Figure 24A:
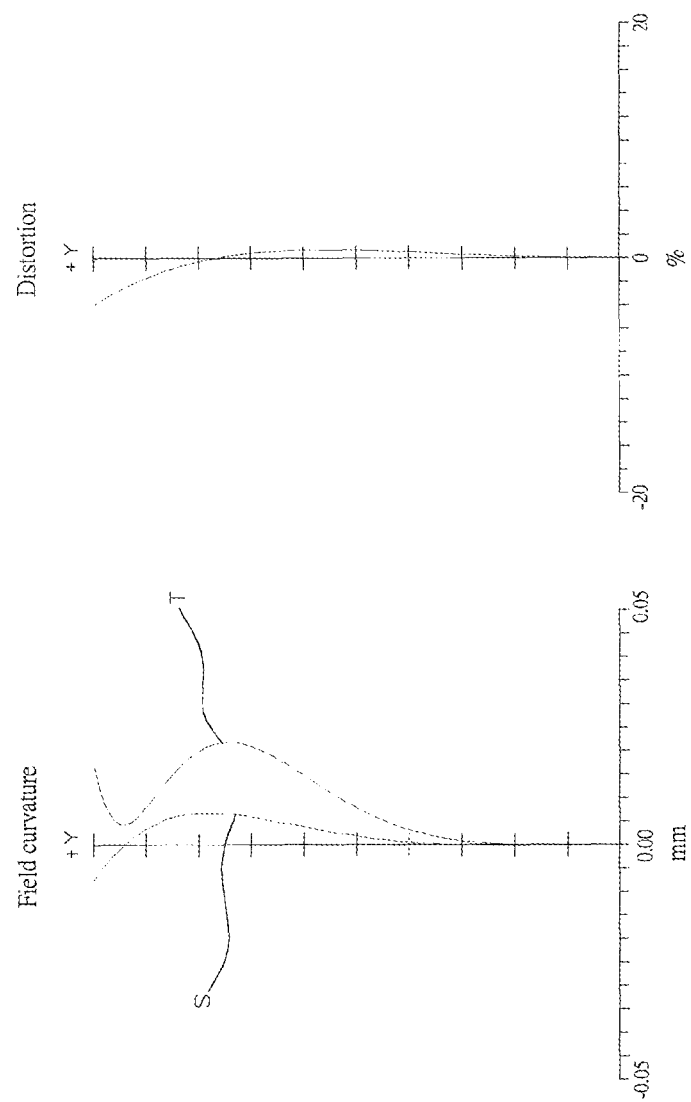
FIG. 24A is a field curvature diagram and a distortion diagram of the fourth preferred embodiment of the present invention in the telephoto mode.
Figures 24B, 24C:
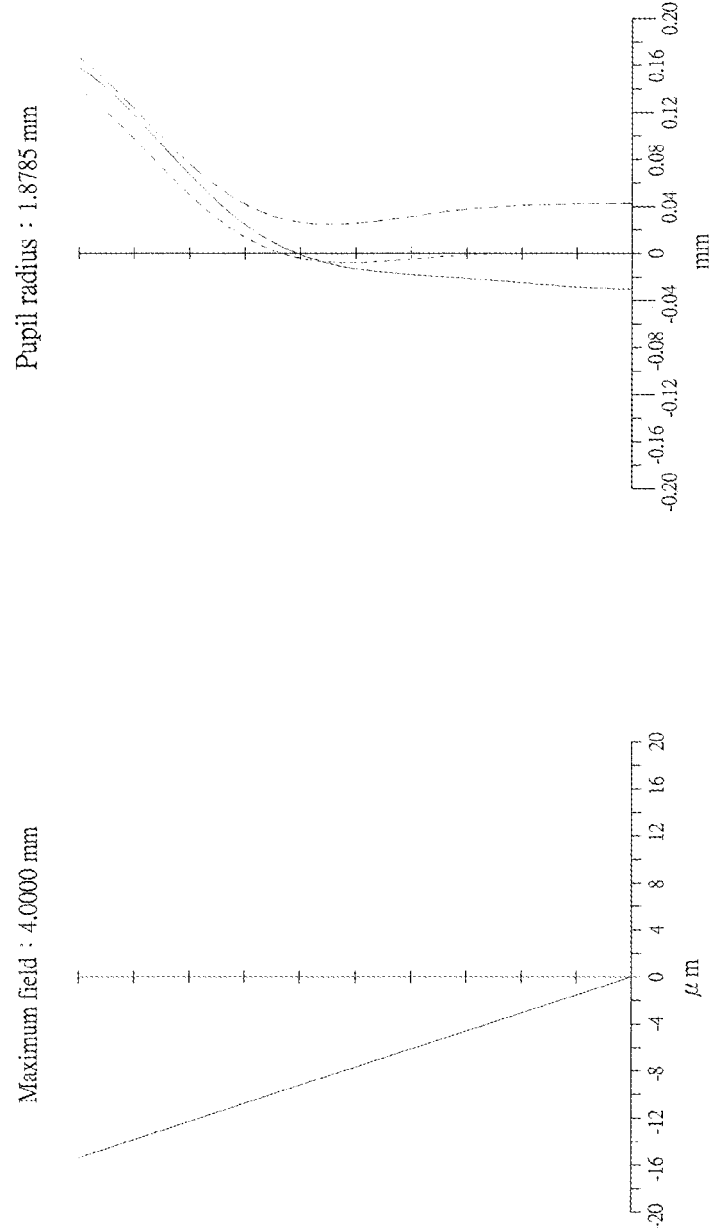
FIG. 24B is a transverse chromatic aberration diagram of the fourth preferred embodiment of the present invention in the telephoto mode.
FIG. 24C is a spherical aberration diagram of the fourth preferred embodiment of the present invention in the telephoto mode.
Figure 24D:
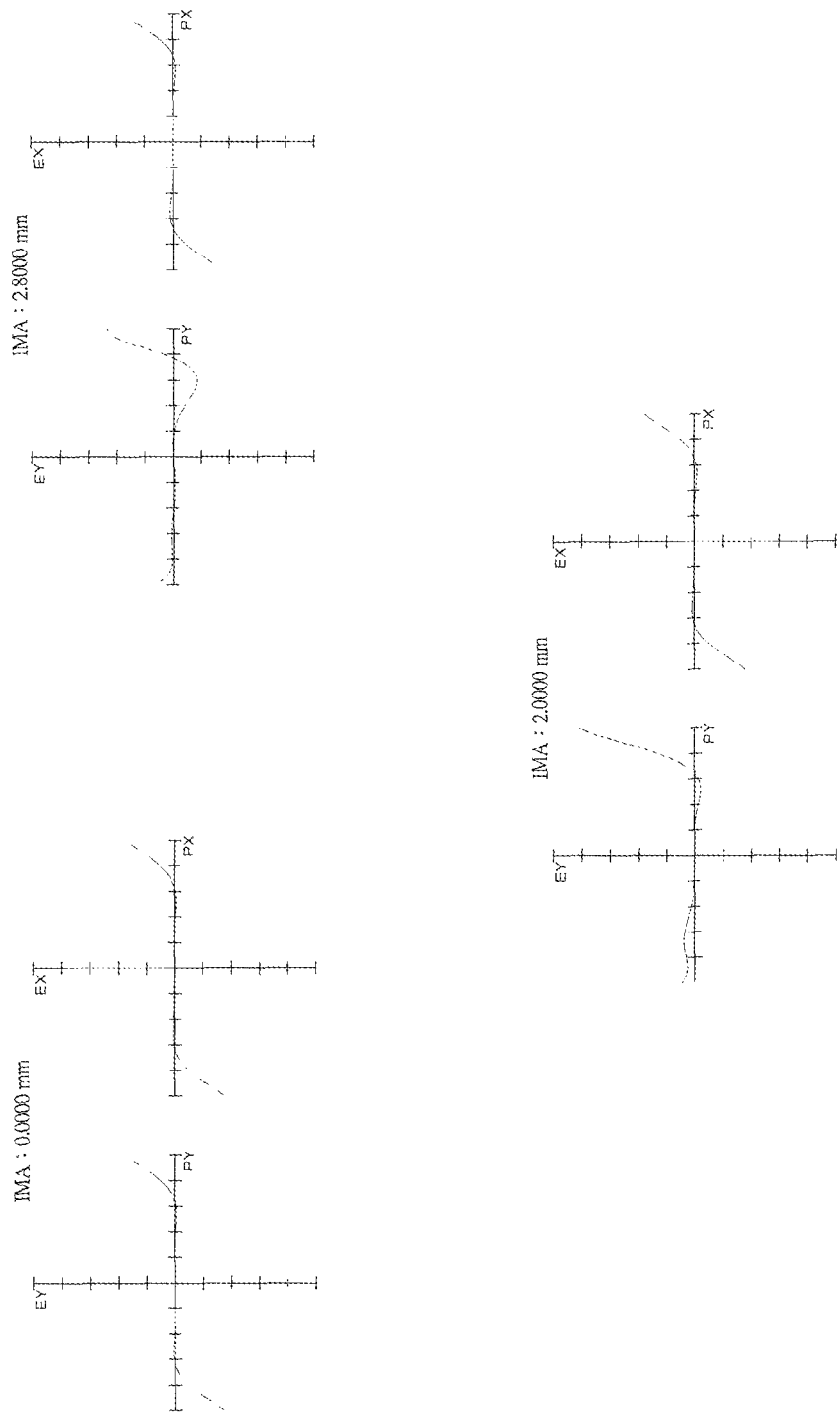
FIG. 24D is a coma aberration diagram of the fourth preferred embodiment of the present invention in the telephoto mode.

In the telephoto mode, FIG. 24A shows the maximum field curvature is about 0.025 mm and −0.01 mm, and the maximum distortion is about −4%. In FIG. 24B, it shows that the maximum transverse chromatic aberration is about −16 μm. FIG. 24C shows that the maximum spherical aberration is about 0.2 mm and −0.04 mm. FIG. 24D shows that all the coma aberrations of the zoom lens 4 are acceptable.

In conclusion, the zoom lens of the present invention has the features of small size, high zoom ratio, and high optical performance.

The description above is a few preferred embodiments of the present invention and the equivalence of the present invention is still in the scope of claim construction of the present invention.

What is claimed is:

1. A zoom lens, comprising a first lens group, a second lens group, an aperture, a third lens group, a fourth lens group, and an image surface in sequence along an optical axis from an object side to an image side;
the first lens group having positive refractive power, and including at least two lenses, wherein one of the lenses has negative refractive power, and one of the lenses has positive refractive power;
the second lens group having negative refractive power, and including three lenses, wherein one of the lenses has positive refractive power, and the rest two lenses have negative refractive power;
the third lens group having positive refractive power, and including at least two lenses, wherein one of the lenses has negative refractive power, and one of the lenses has positive refractive power;
the fourth lens group having positive refractive power;
wherein the zoom lens is switched to a telephoto mode from a wide-angle mode by moving the first lens group toward the object side, moving the second lens group toward the image side, and moving the third lens group toward the object side; and
wherein the lenses of the second lens group from the object side to the image side respectively have negative refractive power, positive refractive power, and negative refractive power.

2. The zoom lens as defined in claim 1, wherein the first lens group has three lenses, and the lenses from the object side to the image side respectively have negative refractive power, positive refractive power, and positive refractive power.

3. The zoom lens as defined in claim 1, wherein the first lens group has two lenses, and the lenses from the object side to the image side respectively have negative refractive power and positive refractive power.

4. The zoom lens as defined in claim 1, wherein the second lenses of the second lens group has at least an aspheric surface.

5. The zoom lens as defined in claim 1, wherein each lens of the second lens group has at least an aspheric surface.

6. The zoom lens as defined in claim 1, wherein the third lens group has three lenses, and the lenses from the object side to the image side respectively have positive refractive power, positive refractive power, and negative refractive power.

7. The zoom lens as defined in claim 1, wherein the third lens group has two lenses, and the lenses from the object side to the image side respectively have positive refractive power and negative refractive power.

8. The zoom lens as defined in claim 7, wherein the third lens group has a doublet with negative refractive power, and the doublet has a biconvex lens and a biconcave lens, and the biconvex lens is proximal to the object side.

9. The zoom lens as defined in claim 1, wherein the third lens group has at least an aspheric lens.

10. The zoom lens as defined in claim 1, wherein the fourth lens group is moved toward the object side when the zoom lens is focusing.

11. The zoom lens as defined in claim 1, wherein the zoom lens satisfies a feature of $0.35 \leq (MG1 \cdot fW)/(fT \cdot Y) \leq 0.9$, wherein MG1 is a distance of movement of the first lens group when the zoom lens is switched to the telephoto mode from the wide-angle mode; fW is a focus length of the zoom lens in wide-angle mode; fT is a focus length of the zoom lens in telephoto mode; and Y is a half of a maximum diagonal of the image surface IMA.

12. The zoom lens as defined in claim 1, wherein the zoom lens satisfies a feature of $0 < |(MG2 \cdot Y)/fG2| \leq 1.0$, wherein MG2 is a distance of movement of the second lens group when the zoom lens is switched to the telephoto mode from the wide-angle mode; Y is a half of a maximum diagonal of the image surface; and fG2 is a focus length of the second lens group.

13. The zoom lens as defined in claim 1, wherein the zoom lens satisfies a feature of $1.3 \leq (fG2 \cdot MG3)/fG1 \leq 1.8$, wherein fG2 is a focus length of the second lens group; MG3 is a distance of movement of the third lens group when the zoom lens is switched to the telephoto mode from the wide-angle mode; and fG1 is a focus length of the first lens group.

14. The zoom lens as defined in claim 1, wherein the zoom lens satisfies a feature of $1.00 \leq |fG3/fG2| 1.45$, wherein fG2 is a focus length of the second lens group; and fG3 is a focus length of the third lens group.